United States Patent
Kammeyer et al.

(10) Patent No.: US 10,205,828 B1
(45) Date of Patent: *Feb. 12, 2019

(54) METHOD AND SYSTEM FOR A SCALABLE COMPUTER-TELEPHONY INTEGRATION SYSTEM

(71) Applicant: STATE FARM MUTUAL AUTOMOBILE INSURANCE COMPANY, Bloomington, IL (US)

(72) Inventors: Aaron C. Kammeyer, Clinton, IL (US); Randall J. Kirchner, Normal, IL (US); Christopher L. Ward, Normal, IL (US); Louis A. Littell, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,521

(22) Filed: Jan. 5, 2018

Related U.S. Application Data

(63) Continuation of application No. 15/363,464, filed on Nov. 29, 2016, now Pat. No. 9,900,434, which is a
(Continued)

(51) Int. Cl.
*H04M 3/00* (2006.01)
*H04M 5/00* (2006.01)
(Continued)

(52) U.S. Cl.
CPC .... *H04M 3/5183* (2013.01); *G06F 17/30598* (2013.01); *G06F 21/6218* (2013.01);
(Continued)

(58) Field of Classification Search
CPC ....... G10L 15/00; G06Q 10/06; H04M 3/323; H04M 3/36; H04M 3/4217; H04M 3/4285;
(Continued)

(56) References Cited

U.S. PATENT DOCUMENTS

| | | | | |
|---|---|---|---|---|
| 5,229,947 A * | 7/1993 | Ross | ................... | G09B 29/106 340/990 |
| 5,442,693 A * | 8/1995 | Hays | ................... | H04M 3/4931 379/267 |

(Continued)

OTHER PUBLICATIONS

Office Action issued in U.S. Appl. No. 15/075,673 dated May 25, 2016.
(Continued)

*Primary Examiner* — Khai N. Nguyen

(57) ABSTRACT

Methods, systems, apparatus, and non-transitory computer readable media are described for a scalable computer-telephony integration system. Various aspects may include storing sets of call agent login information for several call agents within the computer-telephony integration system and across several independent computing systems in a contact center login database. Additionally, various aspects may include generating several contact center service categories and sets of contact information for each contact center service category, which may be stored in a contact center directory database. When an incoming call is received from a customer, various aspects may include obtaining customer call information from the customer and generating a customer call key, which may be stored as a reference to the customer call information in a contact center customer call information database. The call key may be used to reduce an amount of data electronically transferred between call agents during telephone call transfers.

20 Claims, 14 Drawing Sheets

Related U.S. Application Data continuation of application No. 15/075,679, filed on Mar. 21, 2016, now Pat. No. 9,544,434.

(60) Provisional application No. 62/137,873, filed on Mar. 25, 2015.

(51) Int. Cl.

| | | |
|---|---|---|
| *H04M 3/51* | (2006.01) | |
| *G06F 17/30* | (2006.01) | |
| *G06F 21/62* | (2013.01) | |
| *G06F 21/84* | (2013.01) | |
| *G06Q 40/02* | (2012.01) | |
| *G06Q 40/08* | (2012.01) | |
| *H04M 3/523* | (2006.01) | |

(52) U.S. Cl.
CPC ............ *G06F 21/84* (2013.01); *G06Q 40/02* (2013.01); *G06Q 40/08* (2013.01); *H04M 3/5133* (2013.01); *H04M 3/5233* (2013.01); *H04M 2203/256* (2013.01); *H04M 2203/404* (2013.01); *H04M 2203/60* (2013.01); *H04M 2203/6009* (2013.01)

(58) Field of Classification Search
CPC ............ H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 2203/2011; H04M 2203/2061; H04M 2242/00; H04M 2242/08; H04M 2242/12
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
See application file for complete search history.

(56) References Cited

U.S. PATENT DOCUMENTS

| | | | | |
|---|---|---|---|---|
| 5,465,286 A * | 11/1995 | Clare | ...................... | H04M 3/51 379/201.06 |
| 5,946,386 A * | 8/1999 | Rogers | ................... | H04L 29/06 379/265.09 |
| 6,014,658 A * | 1/2000 | Pretz | ...................... | G06Q 30/02 |
| 6,314,089 B1 | 11/2001 | Szlam et al. | | |
| 6,405,033 B1 * | 6/2002 | Kennedy, III | .......... | H04M 3/51 455/414.1 |
| 7,756,890 B2 * | 7/2010 | Carter | ............... | G06F 17/30867 707/776 |
| 7,957,990 B2 * | 6/2011 | Hawkins | ................ | G06Q 10/06 705/28 |
| 8,223,956 B2 * | 7/2012 | Williams | ............ | H04M 3/5233 379/265.11 |
| 8,290,139 B2 | 10/2012 | Kumar et al. | | |
| 8,520,831 B2 * | 8/2013 | Kuns | ....................... | H04M 3/51 379/265.02 |
| 8,666,929 B2 * | 3/2014 | Jaffer | ................... | H04M 3/5191 705/304 |
| 8,738,412 B2 * | 5/2014 | Flockhart | ............... | G06Q 10/06 705/7.14 |
| 8,861,706 B2 * | 10/2014 | Padmanabhan | ..... | H04M 3/4931 379/218.01 |
| 8,930,465 B2 * | 1/2015 | Jaffer | ................... | H04M 3/5191 709/202 |
| 8,995,423 B2 | 3/2015 | Fedorov | | |
| 9,106,750 B2 * | 8/2015 | Klemm | ............... | H04M 3/5233 |
| 9,544,434 B1 * | 1/2017 | Kammeyer | ......... | H04M 3/5175 |
| 9,900,434 B1 * | 2/2018 | Kammeyer | ......... | H04M 3/5183 |
| 2002/0026575 A1 | 2/2002 | Wheeler et al. | | |
| 2004/0062373 A1 * | 4/2004 | Baker | ................. | H04M 3/4931 379/218.01 |
| 2004/0260952 A1 | 12/2004 | Newman et al. | | |
| 2006/0282535 A1 | 12/2006 | Matsukawa et al. | | |
| 2007/0038568 A1 | 2/2007 | Greene et al. | | |
| 2009/0316879 A1 * | 12/2009 | Kuns | ....................... | H04M 3/22 379/265.09 |
| 2010/0287131 A1 * | 11/2010 | Church | .................. | G06Q 10/00 706/47 |
| 2011/0150205 A1 * | 6/2011 | Baumeister | ......... | H04M 3/4931 379/218.01 |
| 2013/0022188 A1 * | 1/2013 | Padmanabhan | ..... | H04M 3/4931 379/201.08 |
| 2013/0083908 A1 | 4/2013 | Kolesov et al. | | |
| 2017/0142169 A1 | 5/2017 | Fedorov | | |

OTHER PUBLICATIONS

U.S. Appl. No. 15/075,673, filed Mar. 21, 2016.
U.S. Appl. No. 15/075,679, filed Mar. 21, 2016.
U.S. Appl. No. 15/075,685, filed Mar. 21, 2016.
Office Action issued in U.S. Appl. No. 15/075,685 dated Dec. 16, 2016.
U.S. Appl. No. 15/363,464, filed Nov. 29, 2016.
U.S. Appl. No. 15/406,171 dated Jan. 13, 2017.
Office Action issued in U.S. Appl. No. 15/363,464 dated Jun. 2, 2017.
Office Action issued in U.S. Appl. No. 15/406,171 dated Mar. 10, 2017.
U.S. Appl. No. 15/635,459, filed Jun. 28, 2017.
U.S. Appl. No. 15/703,242, filed Sep. 13, 2017.
Office Action for U.S. Appl. No. 15/635,459 dated Aug. 24, 2017.
Office Action for U.S. Appl. No. 15/703,242 dated Nov. 16, 2017.

\* cited by examiner

FIG. 4B

Contact Centers
Profiles
Categories
  Add Categories
Phone Numbers
  Add Phone Number Actions: [Add Category] [Delete Category]

Category Details

Category Criteria  Edit ← 439
Category Name: Auto Claims Central
Description: Auto Claims Central Phone Number Details   Assign Phone Numbers        Search:

| Phone Number △ | Description |
|---|---|
| 32799 | |
| 35100 | |
| 50156 | |
| 62948 | |
| 63227 | |
| 67101 | |
| 67103 | |
| 69009 | |

434, 436, 438

Assign Phone Numbers to Category

Category: Bob's Auto Shop ← 442
Description:

Assign Phone Numbers

| Select ▼ | Phone Number ▲▼ | Description: ▲▼ |
|---|---|---|
| ☑ | 12345 | Alex Smith |
| ☑ | 54321 | Bill Jacobs |
| ☑ | 99999 | Jerry Thomas |
| ☐ | 32799 | |
| ☐ | 35100 | |
| ☐ | 35301 | |
| ☐ | 61948 | |

Showing 1 to 69 of 69 entries

Search:

Sort Order

Save    Cancel

Contact Centers
Profiles
Categories
Add Categories
Phone Numbers
Add Phone Number 444
446
448

Add Phone Numbers
(Fields marked* are mandatory)

Contact center:
Phone Number: 15553467821
Description:

Assign Categories:                    Search:

| Select ▼ | Category Name ▲▼ | Description: | Sort Order |
|---|---|---|---|
| ☐ | Voicemail | Voicemail | |
| ☐ | Agency | Agency | |
| ☑ | Bob's Auto Shop | | |
| ☐ | matt test | matt test1 | |
| ☐ | matt test2 | | |
| ☐ | Auto Claims Central | Auto Claims Central | |
| ☐ | Catastrophe Quick Resoonese Team | Catastrophe Quick Resoonese Team | |

Showing 1 to 14 of 14 entries

Save

*FIG. 4E*

METHOD AND SYSTEM FOR A SCALABLE COMPUTER-TELEPHONY INTEGRATION SYSTEM

CROSS-REFERENCE TO RELATED APPLICATIONS

This application is a continuation of and claims priority to U.S. application Ser. No. 15/363,464 filed on Nov. 29, 2016 (now U.S. Pat. No. 9,900,434), entitled "Method and System For A Scalable Computer-Telephony Integration System," which is a continuation of and claims priority to U.S. application Ser. No. 15/075,679 filed on Mar. 21, 2016 (now U.S. Pat. No. 9,544,434), entitled "Method and System For A Scalable Computer-Telephony Integration System," which claims priority to and the benefit of the filing date of provisional U.S. Patent Application No. 62/137,873 entitled "Method And System For A Scalable Computer-Telephony Integration System," filed on Mar. 25, 2015, the entire contents of each of which is hereby expressly incorporated herein by reference.

TECHNICAL FIELD

The present disclosure generally relates to methods, systems, apparatus, and non-transitory computer readable media for a scalable computer-telephony integration system and, more particularly to generating and accessing centralized databases for call agents across several independent systems to interact within the computer-telephony integration system.

BACKGROUND

Today, in a competitive sales market, including insurance sales, organizations often field or service customer calls via a contact center. The contact center may be a unit within the organization or a separate business that the independent organization contracts with to receive customer calls, for example. In any case, the calls to the contact center are typically handled by providing contact information, such as an 800 number for a customer to call. When the customer calls the 800 number, a contact center call agent answers the phone, manually confirms the customer's identity, identifies the purpose of the call, helps the customer, as needed, and ends the call. In some scenarios, the call may first be answered by a computer which may request a series of inputs from the user for determining where to direct the call, and based upon the received inputs, may direct the call to a contact center call agent who responds to the call as described above.

However, large organizations may have several divisions where the divisions operate nearly independently of each other, and/or where each division has a separate contact center or a different group of call agents responding to the calls. For example, an insurance organization may include an automobile insurance division, a life insurance division, a banking division, a homeowner's insurance division, etc.

BRIEF SUMMARY

The present embodiments may relate to generating and accessing centralized databases for call agents across several independent systems to interact within a computer-telephony integration (CTI) system. The CTI system may include a CTI server device, which may receive and/or store customer call information for customers who initiate calls with the CTI system. The CTI server device may also store a customer call key as a reference to the customer call information, so that the customer call key may be transferred from the CTI system to a call agent and/or from call agent to call agent when a call is transferred. In addition to customer call information, the CTI server device may combine call agent login information from several independent systems and store the call agent login information in a centralized database, which may be accessible by all of the call agents across the several independent systems.

Moreover, the CTI server device may generate and/or store a contact center directory, including contact information for call agents, which may be categorized by contact center service category. For example, the contact center directory may include an automobile insurance deductible contact center service category, which may include contact information for ten call agents each assigned to automobile insurance deductibles. Call agents across the several independent systems may access the contact center directory to communicate with other call agents assigned to a particular department or contact center service category.

In one aspect, a computer-implemented method for presenting a contact center directory in a scalable computer-telephony integration system may be provided. The method may include: (1) presenting (via one or more processors and/or wired or wireless communication and/or data transmission) a plurality of contact center service categories to a system administrator, each contact center service category corresponding to a particular type of contact center service in a computer-telephony integration system; for each of the plurality of contact center service categories, (2) presenting (via one or more processors and/or wired or wireless communication and/or data transmission) one or more sets of contact information for communicating with call agents assigned to the contact center service category; and/or (3) presenting (via the one or more processors and/or wired or wireless communication and/or data transmission) one or more user controls for editing at least one of: (i) the plurality of contact center service categories, (ii) the one or more sets of contact information for communicating with the call agents assigned to the plurality of contact center service categories, or (iii) associations between the plurality of contact center service categories and the one or more sets of contact information for communicating with the call agents. The method may include additional, fewer, or alternative actions, including those discussed elsewhere herein.

In another aspect, a client device for presenting a contact center directory in a scalable computer-telephony integration system may be provided. The system may include one or more processors; and/or a non-transitory computer-readable memory communicatively coupled to the one or more processors and storing thereon instructions. When executed by the one or more processors, the instructions may cause the client device to: (1) present a plurality of contact center service categories to a system administrator, each contact center service category corresponding to a particular type of contact center service in a computer-telephony integration system; for each of the plurality of contact center service categories, (2) present one or more sets of contact information for communicating with call agents assigned to the contact center service category on the display; and/or (3) present one or more user controls for editing at least one of: (i) the plurality of contact center service categories, (ii) the one or more sets of contact information for communicating with the call agents assigned to the plurality of contact center service categories, or (iii) associations between the plurality of contact center service categories and the one or more sets of contact information for communicating with the call agents. The system may include additional, fewer, or alternate components and/or functionality, including that discussed elsewhere herein.

In yet another aspect, a non-transitory computer-readable memory may be provided. The non-transitory computer-readable memory may store instructions thereon, that when executed by one or more processors, cause the one or more processors to: (1) present a plurality of contact center service categories to a system administrator, each contact center service category corresponding to a particular type of contact center service in a computer-telephony integration system; for each of the plurality of contact center service categories, (2) present one or more sets of contact information for communicating with call agents assigned to the contact center service category on the display; and/or (3) present one or more user controls for editing at least one of: (i) the plurality of contact center service categories, (ii) the one or more sets of contact information for communicating with the call agents assigned to the plurality of contact center service categories, or (iii) associations between the plurality of contact center service categories and the one or more sets of contact information for communicating with the call agents. The non-transitory computer-readable memory may include additional, fewer, or alternate components and/or functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

FIG. 4B depicts a first exemplary system administrator directory display for adding and/or deleting contact center service categories from the directory in accordance with an exemplary aspect of the present disclosure;

FIG. 4C depicts a second exemplary system administrator directory display for assigning contact information to a contact center service category in accordance with an exemplary aspect of the present disclosure;

FIG. 4E depicts a fourth exemplary system administrator directory display for adding contact information to the directory and assigning categories to the added contact information in accordance with an exemplary aspect of the present disclosure;

Figure 1:
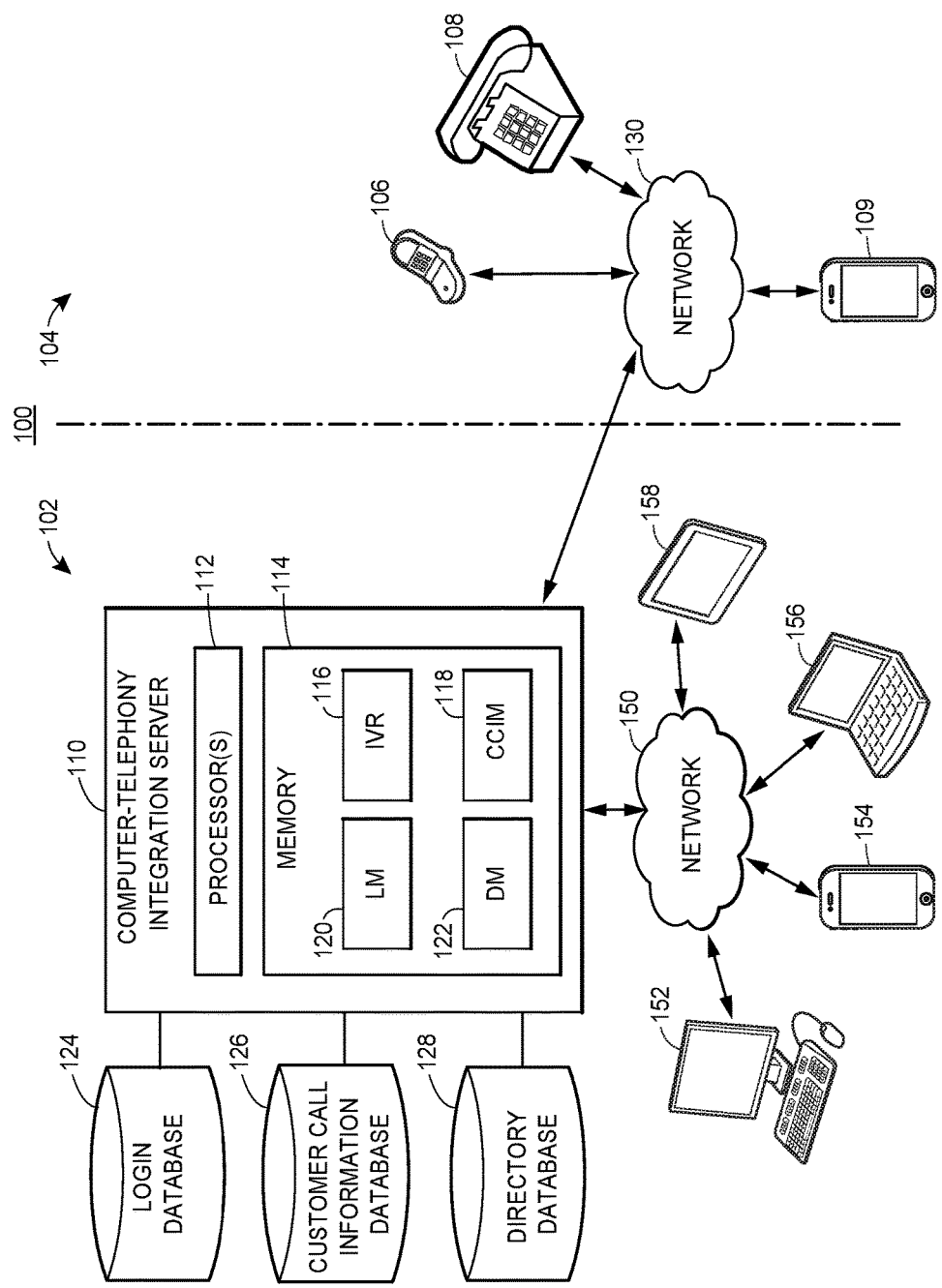
FIG. 1 illustrates a block diagram of a computer network and system on which an exemplary scalable computer-telephony integration (CTI) system may operate in accordance with an exemplary aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

To generate a scalable CTI system, a CTI server device may receive call agent login information from each of several independent systems. For example, the CTI server device may receive usernames and/or passwords for call agents within each of the automobile insurance division, life insurance division, banking or loan division, homeowner's insurance division, etc., of an insurance company. The CTI server device may then combine all of the call agent login information across the several independent systems into a single, centralized contact center login database. In this manner, call agents associated with any division may login to the CTI system via the centralized contact center login database. Moreover, call agents with multiple user profiles (e.g., a call agent associated with both the automobile insurance division and the life insurance division), may login to either user profile via the centralized contact center login database. Furthermore, system administrators may add, remove, and/or update call agent login information via the single contact center login database as opposed to accessing several databases corresponding to each of the independent systems.

After logging in to the CTI system, a call agent may view a contact center directory, which may include contact information for interacting with other call agents within the CTI system, and/or which may be organized by contact center service category. For example, the CTI server device may generate indications of several contact center service categories, such as support, fire claims central, automobile claims central, insurance quoting, vehicle or home loans, etc. The CTI server device may also generate sets of contact information for contacting call agents assigned to a contact center service category. For example, the CTI server device may generate a name and phone number for contacting call agent John Doe in fire claims. Each call agent may have permission to view some of the contact center service categories and corresponding contact information on a display generated by the CTI server device. In this manner, the call agent may transfer calls and/or speak with a call agent assigned to the contact center service category who may be better equipped to respond to the customer's requests.

Additionally, when the customer initiates a call with the CTI system, the CTI system may ask the customer a series of questions for determining where to direct the call. For example, an interactive voice response (IVR) system, may obtain answers to questions such as, "Are you calling about questions with regard to claims? . . . a deductible? . . . or premium payments?" or "Please state your policy number." The CTI server may then obtain the customer's answers along with additional customer call information, such as the phone number which the customer used to make the call, or previously stored information associated with the customer's policy number, such as the type of insurance associated with the policy number, the date in which the policy was purchased, the subscriber name, etc.

The customer's answers and the additional customer call information may be stored as customer call information in a contact center customer call information database. Additionally, the CTI server may generate a customer call key which may be a series of alphanumeric characters, and/or may store the customer call key in the contact center customer call information database as a reference to the customer call information for the customer. In this manner, when the CTI system transfers the customer's call to a call agent, and/or when a call agent transfers the customer's call to another call agent, the customer call key may be passed rather than the customer call information for the customer to minimize the amount of data transferred over the communication network.

The present aspects advantageously may allow for system administrators to add, remove, and/or update data within the CTI system via centralized databases as opposed to separate databases for each independent system within an organization. Moreover, the present aspects may advantageously minimize the amount of data transferred over CTI communication networks by transmitting customer call keys as references to stored customer call information, thereby reducing bandwidth usage and/or increasing processing speed within the CTI system.

Generally speaking, the techniques for generating a scalable CTI may be implemented in one or more network servers such as a CTI server, in one or more contact center devices, in one or more customer telephone devices, and/or a system that includes several of these devices. However, for clarity, the examples below focus primarily on an embodiment in which a CTI server device receives a call initiated by a customer from a customer telephone device. The CTI server device may also access and/or generate a contact center login database, a contact center directory database, and/or a contact center customer call information database.

The CTI server device may obtain login information for a call agent from one of the contact center devices, and after verifying the call agent login information via the contact center login database, the CTI server device may provide access to data within the CTI system to the contact center device according to the call agent's permissions.

For example, the contact center device may obtain access to some of the contact center service categories and associated sets of contact information from the contact center directory database. The CTI server device may also transfer the call to the contact center device, as well as customer call information received from the customer, by providing a customer call key to the call agent, which references the customer call information in the contact center customer call information database.

I. EXEMPLARY SCALABLE CTI ENVIRONMENT

FIG. 1 illustrates various aspects of an exemplary environment implementing a scalable CTI system 100. The high-level architecture includes both hardware and software applications, as well as various data communications channels for communicating data between the various hardware and software components. The scalable CTI system 100 may be roughly divided into components within a contact center network 102 (e.g. components which may have access to secure data files for an insurance provider), and components outside of the contact center network 104 (e.g. components which may not have access to the secure data files). The components within the contact center network 102 may include a CTI server device 110, and/or a plurality of contact center devices 152-158 which may be communicatively connected through a contact center network 150, as described below. The components outside of the contact center network 104 may include a plurality of customer telephone devices 106-109 which may be communicatively connected to the components within the contact center network 102 through a network 130, as described below.

The CTI server device 110 may have an associated contact center login database 124 for storing call agent login information obtained from several independent systems, an associated contact center customer call information database 126 for storing customer call information and associated customer call keys corresponding to phone calls received from customers, and/or an associated contact center directory database 128 for storing indications of contact center service categories, and/or sets of contact information for call agents assigned to each contact center service categories.

Moreover, the CTI server device 110 may include one or more processor(s) 112 such as a microprocessor coupled to a memory 114. The memory 114 may be tangible, non-transitory memory and may include any types of suitable memory modules, including random access memory (RAM), read-only memory (ROM), flash memory, other types of persistent memory, etc. The memory 114 may store, for example instructions executable on the processors 112 for an interactive voice response (IVR) module 116, a customer call information module (CCIM) 118, a login module (LM) 120, and/or a directory module (DM) 122. The CTI server device 110 is described in more detail below with reference to FIG. 2A.

A. Exemplary Interactive Voice Response (IVR) Module

When a customer initiates a call with the scalable CTI system 100, the IVR module 116 may communicate with the customer through a series of questions, which the customer may answer by dialing numbers on the keypad of the customer telephone device which was used to make the call, and/or by providing voice responses. For example, the IVR module 116 may include a text-to-speech engine, which may provide an audio output to the customer stating, "If you are calling to file an insurance claim, press '1'; if you are calling to ask about a deductible or premium payment, press '2'; if you would like to purchase an insurance policy, press '3'; otherwise, stay on the line for further options." In response, the customer may dial a number on her customer telephone device, and the IVR module may provide additional requests based upon the response, transfer the call to a call agent and/or provide an answer to the customer's inquiry based upon the customer's input.

Additionally, the IVR module 116 may receive a voice response from the customer such as, "filing an insurance claim," and a speech recognition engine within the IVR module may transcribe the voice response to text. The IVR module 116 may then provide additional requests based upon the response, transfer the call to a call agent, and/or provide an answer to the customer's inquiry based upon the customer's input.

In some embodiments, the IVR module 116 may also include a natural language processing engine for determining the customer's inquiry based upon the voice response. For example, if the IVR module 116 provides the audio output, "What is the subject of your inquiry?" and the customer responds, "Filing an insurance claim," "Applying for an insurance claim," or "I want to file an insurance claim," the natural language processing engine may determine that the customer would like to file an insurance claim, and the IVR module 116 may then provide additional requests based upon this response, and/or transfer the call to a call agent.

In other embodiments, a call agent may communicate with the customer through a series of questions and/or receive voice responses for the customer. The call agent may then provide additional requests based upon the customer's responses and/or record the customer's responses at the call agent's contact center device.

B. Exemplary Customer Call Information Module (CCIM)

The CCIM 118 may receive the customer's responses from the IVR module 116 and/or store the responses as customer call information, for example, in the contact center customer call information database 126. In other embodiments, the CCIM 118 may receive the customer responses from a call agent's contact center device. The customer call information may include identification information for the customer such as the customer's name, address, phone number, etc. The customer call information may also include the subject of the customer's inquiry, such as filing a claim, purchasing an insurance policy, policy coverage information, etc. Moreover, the customer call information may include the type of insurance policy owned by the customer, such as life insurance or homeowner's insurance, a policy number for the insurance policy, a group number for the insurance policy, etc.

In some embodiments, at least some of the customer call information may be determined by the CCIM 118. For example, the customer's phone number may be obtained automatically when the customer makes the call without a request for this information from the IVR module 116. Moreover, the CCIM 118 may access a customer database, which may include personal information for customers who have previously purchased insurance policies with the insurance provider. For example, the customer database may store a customer name, phone number, address, and/or policy numbers for each of the insurance policies purchased by each customer. As mentioned above, the CCIM 118 may automatically obtain the customer's phone number when the customer calls the scalable CTI system 100, and/or compare the phone number to phone numbers within the customer database. If there is a match, the CCIM 118 may obtain personal information for the customer without a request for this information from the IVR module 116.

In any event, the CCIM 118 may generate a customer call key and/or store the customer call key in a database as a reference to the customer call information. The customer call key may be a set of alphanumeric and/or numeric characters. The customer call key may be randomly generated, generated in ascending or descending order based upon the previously generated customer call keys, and/or generated in any other suitable manner. For example, the customer call key may be an eight digit alphanumeric character string. The CCIM 118 may associate the customer call key with the customer call information. As a result, the customer call information may be obtained using the customer call key in the contact center customer call information database 126.

C. Exemplary Login Module (LM)

The LM 120 may obtain call agent login information from several independent systems within the contact center network 150. For example, the scalable CTI system 100 may be associated with a large organization, such as an insurance provider (or financial services provider) that includes several divisions (such as an automobile insurance division, a life insurance division, a banking division, an insurance claims division, an insurance sales division, an insurance underwriting division, a homeowner's insurance division, etc.). Each division may include a contact center sub-network, which may include several call agents and associated call agent login information for the call agents to login to the contact center sub-network and/or access secure data files within the particular sub-network. For example, call agents within the banking division may have access to secure banking files, such as banking information for customers who open bank accounts. The contact center sub-network for a division may also include one or several servers (not shown), where each server stores call agent profiles corresponding to the call agent login information. A call agent may access her call agent profile by logging in to a particular server within a contact center sub-network using her call agent login information.

In some embodiments, call agents may be part of several divisions within the organization, such as the life insurance division and the automobile insurance division, and as a result, the call agents may have multiple call agent profiles, each accessible from a different server within a contact center sub-network. In some embodiments, a division may not have direct access to another division within the organization.

The call agent login information for the call agents to login to the contact center sub-network may include a username, password, and/or phone number to access a call agent profile. The corresponding call agent profile may include permissions which the call agent needs or possesses to access certain secure data files within the contact center sub-network.

For example, a call agent profile may belong to security groups within the contact center sub-network, where each security group has permission to access certain secure data files. Membership within a security group may be based upon the call agent's job function and/or geographic location. When the call agent logs in to the contact center sub-network, the call agent may access information based upon the permissions associated with the call agent profile corresponding to the username, password, and/or phone number that the call agent provides for logging in.

In any event, the LM 120 may obtain call agent login information from each contact center sub-network and/or corresponding to several call agents, along with a reference to an indication of a particular server within the contact center sub-network which stores the corresponding call agent profiles. For example, a banking division may include contact center sub-network A, which may include Server 1, Server 2, and Server 3. An insurance claims division may include contact center sub-network B, which may include Server 4, Server 5, and Server 6, and/or an insurance sales division may include contact center sub-network C, which may include Server 7, Server 8, and Server 9. Call agent John Doe may be part of the insurance claims division where his call agent profile may be retrieved from Server 5. He may also be part of the insurance sales division where a second call agent profile may be retrieved from Server 9.

The LM 120 may combine the call agent login information from each division within the contact center network 150, and/or store the combined call agent login information and references to indications of corresponding servers, which store call agent profiles for each call agent in a contact center login database 124. For example, the call agent login information may be combined through a series of database operations, such as table relations and/or joins.

When a call agent logs in to the scalable CTI system 100, the username, password, and/or phone number provided by the call agent may be compared to login information within the contact center login database 124. When there is a match, the LM 120 may retrieve the indication of the corresponding server stored with the matching login information, and/or establish a communication between the call agent and the corresponding server (e.g., Server 6), for example, via the contact center network 150. The call agent may then access her call agent profile via the corresponding server.

In this manner, each call agent within the contact center network 150 may login via the contact center login database 124 and the CTI server 110 and/or the LM 120 may dynamically route the call agent to the server corresponding to the call agent's login information. Call agents may not have to establish communication with different databases and/or servers according to a particular division or contact center sub-network. Moreover, call agents who are associated with multiple divisions may login using login information for any of the divisions that they are associated with, and/or may not need to login using separate platforms based upon the particular division that the login information is associated with.

In some embodiments, when a call agent is associated with multiple divisions within the organization, the LM 120 may determine that multiple instances of call agent login information correspond to the same call agent. The LM 120 may associate each set of call agent login information that corresponds to the same call agent, and in some scenarios, when the call agent logs in to the scalable CTI system 100, the call agent may be provided with a user interface, which may allow the call agent to choose one of the sets of call agent login information and/or may prefill at least a portion of the call agent login information (e.g., may prefill the call agent usernames and/or phone numbers) for logging in to a call agent profile. When the call agent chooses one of the sets of call agent login information (e.g., via user controls on the user interface such as a drop-down menu and/or free-form text field), the LM 120 may retrieve the indication of the corresponding server stored with the selected call agent login information, and/or establish a communication between the call agent and the corresponding server (e.g., Server 3), for example, via the contact center network 150.

D. Exemplary Directory Module (DM)

The DM 122 may generate indications of contact center service categories, which may be based upon a division and/or geographic location within the organization. Moreover, the contact center service categories may also be specific to a particular job function within a division. For example, the contact center service categories may include, "Automobile Insurance—Phoenix," "Support—El Paso," "Homeowner's Insurance Claims—New York," "Life Insurance Premiums—Atlanta," etc.

For each of the contact center service categories, the DM 122 may also identify call agents, who may be assigned to the respective contact center service category. For example, based upon the call agent login information and/or call agent profiles, the DM 122 may identify the division, the geographic location, and/or a job function associated with each call agent, for example based upon the respective call agent's security groups and/or permissions. In another example, the DM 122 may obtain personal and/or business information for each call agent from the CTI server device 110, to identify call agents who may be assigned to the respective contact center service category. In any event, the DM 122 may obtain contact information for communicating with the identified call agents, such as a phone number. In some embodiments, call agents may be assigned to several respective contact center service categories.

The DM 122 may store the indications of contact center service categories with indications of the assigned call agents for each contact center service category in the contact center directory database 128, as well as one or more sets of contact information for communicating with each of the assigned call agents. In some embodiments, each of the contact center service categories may be associated with a security group that may include a set of call agents according to each respective call agent profile.

In this manner, members of the security group may view and/or access the contact center service category, as well as indications and/or contact information of the call agents assigned to the contact center service category. Moreover, when a call agent is removed from a contact center service category, and/or when a set of contact information is added, updated, and/or removed for the call agent, each member of the security group may view and/or access the updated information. Furthermore, when a set of contact information is updated for the call agent in one contact center service category, such as "Support—El Paso," the set of contact information may be automatically updated for every other contact center service category the call agent is assigned to, such as "Support—New York," and/or "Support—Atlanta."

E. Exemplary Contact Center Devices

The contact center devices 152-158 may include, by way of example, a desktop computer 152, a mobile device smart-phone 154, a laptop computer 156, a tablet computer 158, a portable media player, a wearable computing device, smart glasses, smart watches, phablets, other smart devices, devices configured for wired or wireless RF (Radio Frequency) communication, a cell phone, a personal digital assistant (PDA), etc. Of course, any contact center device appropriately configured may interact with the scalable CTI system 100. Each of the contact center devices 152-158 may include and/or may be communicatively coupled to a telephone set/headset for communicating with one of the customer telephone devices 106-109.

The contact center devices 152-158 need not necessarily communicate with the contact center network 150 via a wired connection. In some instances, the contact center devices 152-158 may communicate with the contact center network 150 via wireless signals and, in some instances, may communicate with the contact center network 150 via an intervening wireless or wired device, which may be a wireless router, a wireless repeater, a base transceiver station of a mobile telephony provider, etc. The contact center devices 152-158 may include devices which are used by members of a contact center for an organization to access a contact center communication network, such as a local area network (LAN), a virtual private network (VPN), etc.

The contact center devices 152-158 may access the contact center network 150 via call agent profiles and may access secure data assets shared within the contact center network 150 based upon permissions associated with security groups corresponding to the call agent profiles. Moreover, the contact center devices 152-158 may also include devices which may be used to set and/or change permissions for security groups to access secure data assets, and to place and/or remove call agent profiles from security groups. For example, the contact center devices 152-158 may include a contact center device used by a system administrator.

Each of the contact center devices 152-158 may interact with the CTI server device 110 to receive web pages and/or server data and may display the web pages and/or server data via a client application and/or an Internet browser (described below). For example, the desktop computer 152 may display an application screen of a client application (e.g., a call agent application) and/or a web page to a user, receive an input from the user, and/or interact with the CTI server device 110 depending on the type of user-specified input. For example, the CTI server device 110 may generate an application screen which includes customer call information for the customer who initiated the call with the scalable CTI system 100, in response to receiving a customer call key corresponding to the customer call information from the desktop computer 152.

It will be appreciated that although only one CTI server device 110 is depicted in FIG. 1, multiple CTI servers 110 may be provided for the purpose of distributing server load, serving different web pages, etc. These multiple CTI servers 110 may include a web server, an entity-specific server (e.g. an Apple® server, etc.), a server that is disposed in a retail or proprietary network, etc. The multiple CTI servers 110 may also include the IVR module 116, the customer call information module 118, the login module 120, and/or the directory module 122 as separate servers which may communicate with each other via the contact center network 150.

The CTI server device 110 may communicate with the contact center devices 152-158 via the contact center network 150. The digital contact center network 150 may be a proprietary network, a secure public Internet, a local area network (LAN), a wide area network (WAN), a virtual private network (VPN) and/or some other type of network, such as a public switched telephone network (PTSN) which may include dedicated access lines, plain ordinary telephone lines, satellite links, combinations of these, etc. Where the digital contact center network 150 comprises the Internet, data communication may take place over the digital contact center network 150 via an Internet communication protocol. In some embodiments, the digital contact center network 150 may be a password protected organizational contact center network where only members of the organization having call agent profiles and/or system administrators may access the contact center network.

While the scalable CTI system 100 includes four contact center devices 152-158, this is merely for ease of illustration only. The scalable CTI system 100 may include tens of contact center devices, hundreds of contact center devices, thousands of contact center devices or any other suitable number of contact center devices.

F. Exemplary Customer Telephone Devices

The customer telephone devices 106-109 may include, by way of example, a cell phone 106, a home phone 108, a mobile device smart-phone 109, a personal digital assistant (PDA), a tablet computer, a portable media player (not shown), a wearable computing device, smart glasses, smart watches, phablets, other smart devices, or any other suitable devices configured to communicate over a PTSN. Of course, any customer telephone device appropriately configured (e.g., any device configured to make phone calls) may interact with the scalable CTI system 100. The customer telephone devices 106-109 need not necessarily communicate with the network 130 via a wired connection. In some instances, the customer telephone devices 106-109 may communicate with the network 130 via wireless signals and, in some instances, may communicate with the network 130 via an intervening wireless or wired device, which may be a wireless router, a wireless repeater, a base transceiver station of a mobile telephony provider, etc.

Each of the customer telephone devices 106-109 may interact with the CTI server device 110 to receive input from the customer, such as voice and/or keypad input, and/or the CTI server device 110 may interact with the customer telephone devices 106-109 depending on the type of customer-specified input. For example, based upon the customer input, the CTI server device 110 may transfer the call to a call agent within the "Homeowner's Insurance Claims—New York," contact center service category. Moreover, the CTI server device 110 may store the customer input as customer call information in the contact center customer call information database 126.

The CTI server device 110 may communicate with the customer telephone devices 106-109 via the network 130. The digital network 130 may be a proprietary network, a secure public Internet, a virtual private network and/or some other type of network, such as a PTSN which may include dedicated access lines, plain ordinary telephone lines, satellite links, a cellular network, combinations of these, etc. Where the digital network 130 comprises the Internet, data communication may take place over the digital network 130 via an Internet communication protocol.

While the scalable CTI system 100 includes three customer telephone devices 106-109, this is merely for ease of illustration only. The scalable CTI system 100 may include hundreds of customer telephone devices, thousands of customer telephone devices, or any other suitable number of customer telephone devices.

II. EXEMPLARY SYSTEM HARDWARE

A. Exemplary CTI Server Device

Figure 2A:
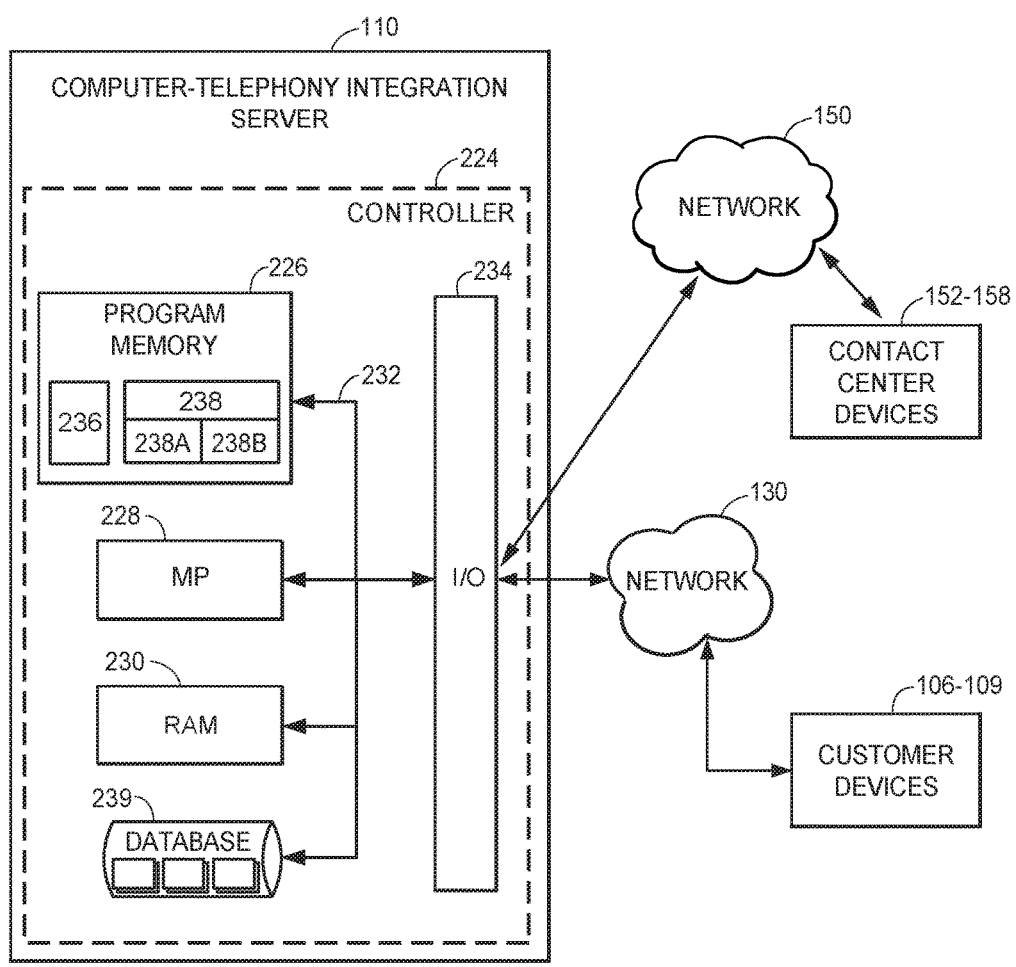
FIG. 2A illustrates a block diagram of an exemplary CTI server device in accordance with an exemplary aspect of the present disclosure.

Turning now to FIG. 2A, the CTI server device 110, may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. The program memory 226 and the microprocessor 228 may be similar to the memory 140 and processor 132 respectively, as described in FIG. 1. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer call information, call agent login information, contact center directory data, web page templates and/or web pages, and other data necessary to interact with users, and/or security administrators through the network 130 and/or the contact center network 150. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the CTI server device 110, which user interface may, for example, allow the system administrator to configure, troubleshoot, and/or test various aspects of the CTI server's operation, including assigning call agent profiles to security groups for accessing secure data files. A server application 238 may operate to receive customer input for example, from a customer telephone device, identify call agents assigned to a particular contact center service category, combine call agent login information from several independent systems, generate customer call keys, etc. The server application 238 may be a single module 238 or a plurality of modules 238A, 238B, 238C (not shown), and 238D (not shown) such as the interactive voice response module 116, the customer call information module 118, the login module 120, and/or the directory module 122, respectively.

While the server application 238 is depicted in FIG. 2A as including two modules, 238A and 238B, the server application 238 may include any number of modules accomplishing tasks related to implantation of the CTI server device 110.

B. Exemplary Contact Center Device

Figure 2B:
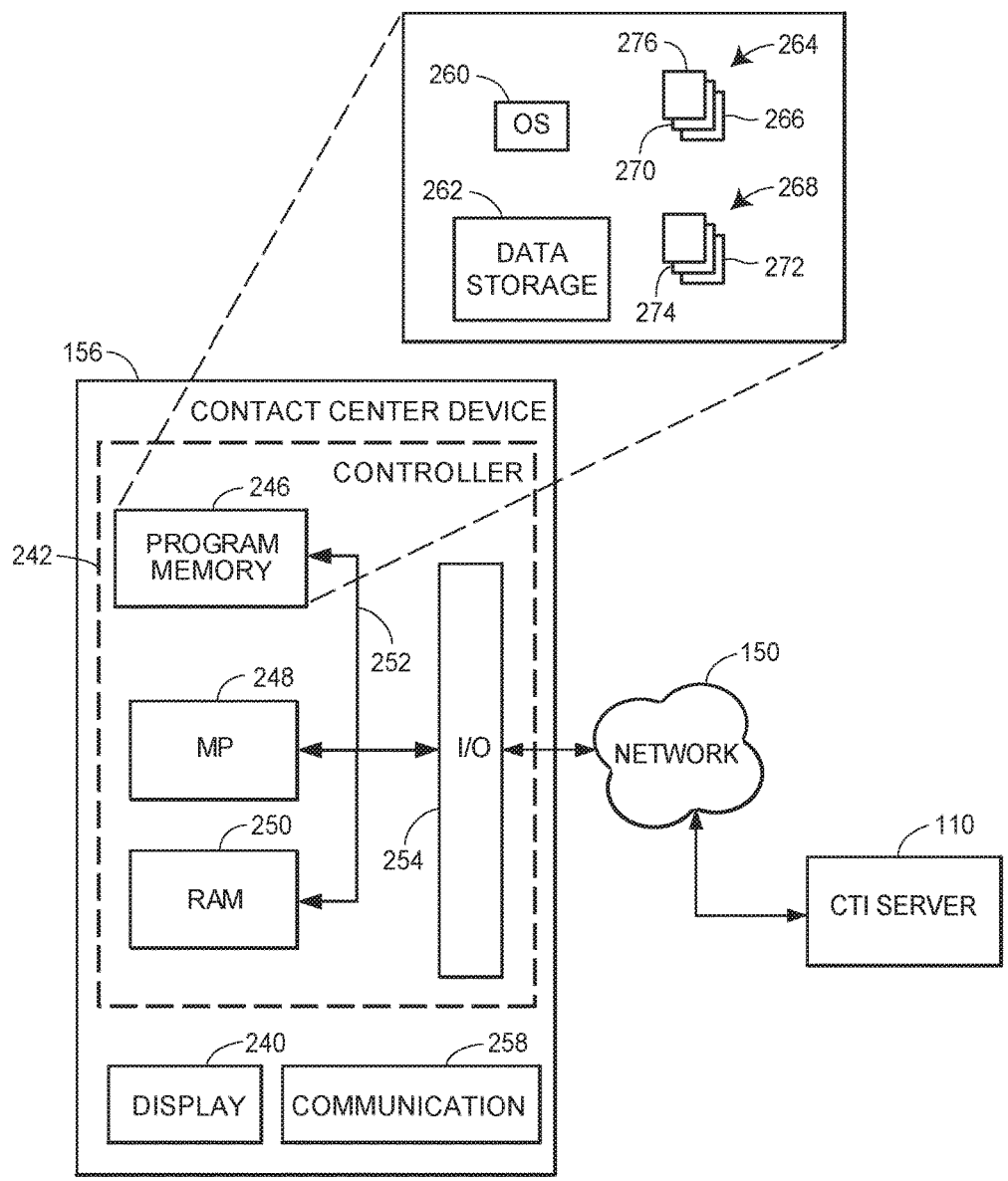
FIG. 2B illustrates a block diagram of an exemplary contact center device in accordance with an exemplary aspect of the present disclosure.

Referring now to FIG. 2B, the laptop computer 156 (or any of the contact center devices 152-158) may include a display 240, a communication unit 258, a user-input device (not shown), and, like the CTI server device 110, a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, data storage 262, a plurality of software applications 264, and/or a plurality of software routines 268. The operating system 260, for example, may include Microsoft Windows®, OS X®, Linux®, Unix®, etc.

The data storage 262 may include data such as call agent profiles, application data for the plurality of applications 264, routine data for the plurality of routines 268, and/or other data necessary to interact with the CTI server device 110 through the digital contact center network 150. In some embodiments, the controller 242 may also include, or otherwise be communicatively connected to, other data storage mechanisms (e.g., one or more hard disk drives, optical storage drives, solid state storage devices, etc.) that reside within the laptop computer 156.

The communication unit 258 may communicate with the CTI server device 110 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the laptop computer 156, an external hardware keyboard communicating via a wired or a wireless connection (e.g., a Bluetooth keyboard), an external mouse, or any other suitable user-input device.

As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 246, in addition to other software applications. One of the plurality of applications 264 may be a client application 266 that may be implemented as a series of machine-readable instructions for performing the various tasks associated with receiving information at, displaying information on, and/or transmitting information from the laptop computer 156.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the CTI server device 110 while also receiving inputs from the call agent. Another application of the plurality of applications may include an embedded web browser 276 that may be implemented as a series of machine-readable instructions for receiving, interpreting, and/or displaying web page information from the CTI server device 110.

One of the plurality of routines may include a call agent login routine 272 which obtains call agent login information from the call agent, transmits the login information to the CTI server device 110, and/or displays secure data files according to the call agent profile associated with the login information on the display 240. Another routine in the plurality of routines may include a call transfer routine 274 that receives a phone number for routing the call to another call agent and/or a customer call key for retrieving customer call information. The call transfer routine 274 may route the call to the other call agent via the received phone number and/or may transmit the customer call key to the other call agent.

Preferably, a call agent may launch the client application 266 from a contact center device, such as one of the contact center devices 152-158, to communicate with the CTI server device 110 to implement the scalable CTI system 100. Additionally, the call agent may also launch or instantiate any other suitable user interface application (e.g., the native application or web browser 270, or any other one of the plurality of software applications 264) to access the CTI server device 110 to realize the scalable CTI system 100.

III. EXEMPLARY CONTACT CENTER LOGIN ENVIRONMENT

A. Exemplary Flow Diagram for a Contact Center Login Database

Figure 3A:
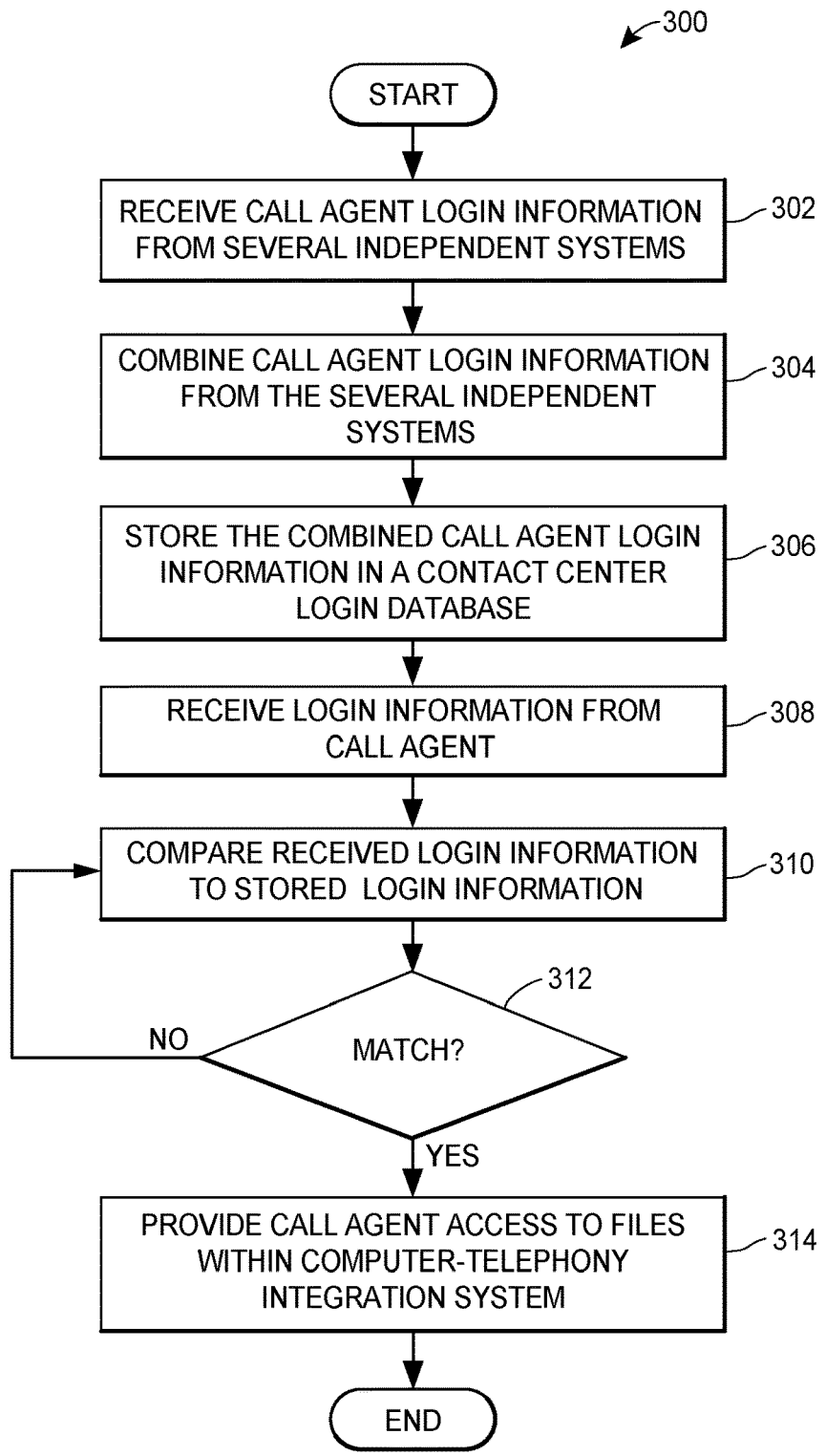
FIG. 3A depicts a flow diagram representing an exemplary method for generating and/or accessing a contact center login database in accordance with an exemplary aspect of the present disclosure.

FIG. 3A depicts a flow diagram representing an exemplary method 300 for generating and/or accessing a contact center login database. The method 300 may be executed on the CTI server device 110. In some embodiments, the method 300 may be implemented in a set of instructions stored on a non-transitory computer-readable memory and executable on one or more processors of the CTI server device 110. For example, the method 300 may be performed by the login module 120 of FIG. 1.

At block 302, call agent login information may be received from several independent systems within the contact center network 150 and/or corresponding to several call agents. As described above, the scalable CTI system 100 may be associated with a large organization that includes several divisions. Each division may include a contact center sub-network, which may include several call agents and/or associated call agent login information for the call agents to login to the contact center sub-network and access secure data files within the particular sub-network. The contact center sub-network for a division may also include one or several servers, where each server stores call agent profiles corresponding to the call agent login information. A call agent may access her call agent profile by logging in to a particular server within a contact center sub-network using her call agent login information. In some embodiments, a division may not have direct access to another division within the organization.

Call agent login information along with a reference to an indication of a particular server within the contact center sub-network which stores the corresponding call agent profiles, may be received at the LM 120 from each division within the contact center network 150.

At block 304, the LM 120 may combine the call agent login information and references to corresponding servers from each division within the contact center network 150. For example, the LM 120 may combine the call agent login information through a series of database operations, such as table relations and/or joins.

The combined sets of call agent login information and references to corresponding servers may be stored in a database, such as the contact center login database 124 (block 306). For example, the contact center login database 124 may store a username, password, and/or phone number for call agent Jen Boe and a reference to Server 2, which Jen Boe may communicate with to access her call agent profile.

Figure 3B:
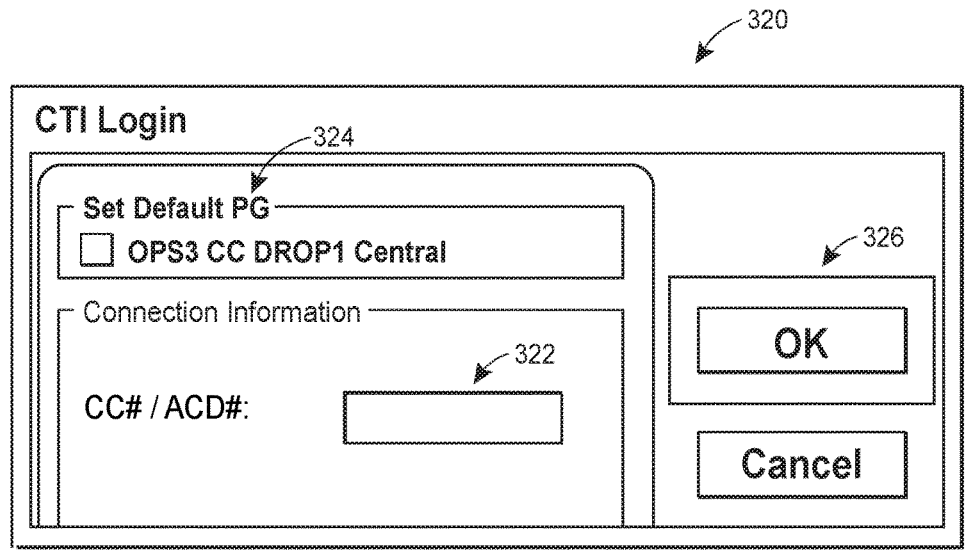
FIG. 3B depicts an exemplary contact center login display in accordance with an exemplary aspect of the present disclosure.
Figure 3C:
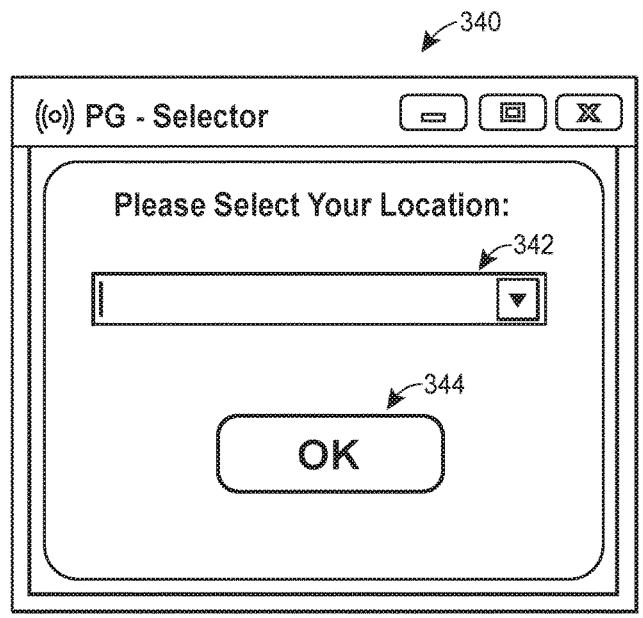
FIG. 3C depicts an exemplary contact center login selection screen in accordance with an exemplary aspect of the present disclosure.

In some embodiments, when a call agent is associated with multiple divisions within the organization, the LM 120 may determine that multiple instances of call agent login information correspond to the same call agent. The LM 120 may associate each set of call agent login information that corresponds to the same call agent, and in some scenarios, when the call agent logs in to the scalable CTI system 100, the call agent may be provided with a user interface that may allow the call agent to choose one of the sets of call agent login information (e.g., via a contact center login selection screen, such as the contact login selections screen 340 as shown in FIG. 3C below), and/or prefill at least a portion of the call agent login information (e.g., may prefill the call agent usernames and/or phone numbers) for logging in to a call agent profile. For example, the call agent may have several call agent profiles, each accessible by servers associated with different independent computing systems. More specifically, the contact center login database 124 may store (a) a first username, password, and/or phone number for call agent Jen Boe and a reference to Server 2 associated with a banking division, and/or the contact center login database 124 may store (b) a second username, password, and/or phone number for Jen Boe and a reference to Server 9 associated with an insurance claims division. The call agent may also select a default call agent profile corresponding to default call agent login information and/or a default server, which may be automatically selected each time the call agent logs in.

At block 308, the LM 120 may receive call agent login information from a call agent. For example, the call agent may enter a username, password, and/or phone number on the call agent's contact center device (e.g., via a contact center login display, such as the contact center login display 320 as shown in FIG. 3B below), which may be received at the LM 120 via the contact center network 150. The LM 120 may then compare the received call agent login information to the sets of call agent login information stored in the contact center login database 124 to authenticate the received call agent login information (block 310).

If there is no match, the call agent may be prompted to reenter the call agent login information (block 308). If there is a match, the LM 120 may retrieve the indication of the corresponding server stored with the matching login information, and/or establish a communication between the call agent and the corresponding server (e.g., Server 6), for example, via the contact center network 150. The call agent may then access her call agent profile via the corresponding server.

The corresponding server may provide access to secure data files within the scalable CTI system 100 to the call agent's contact center device, according to the call agent profile associated with the call agent login information (block 314). Each set of call agent login information may be associated with a call agent profile that may include permissions that the call agent has or needs to access certain secure data files within the contact center network 150, or a particular contact center sub-network.

For example, a call agent profile may belong to security groups within the contact center network, where each security group has permission to access certain secure data files. More specifically, a call agent who works in life insurance claims in Houston may be placed in a security group such that the call agent may have access to customer call information for a customer who called to file a life insurance claim in Houston. In another example, a call agent who receives calls from Milwaukee customers regarding liability coverage for automobile insurance may be placed in a security group such that the call agent may have access to contact information for call agents who receive calls from Milwaukee customers regarding comprehensive coverage for automobile insurance.

When the call agent logs in to a particular call agent login profile, the CTI server device 110 may transmit application screens and/or webpages, which may be displayed by the client application 266 as shown in FIG. 2B, and/or which may include the secure data files that the call agent has or possesses permission to access. In other embodiments, when the call agent logs in to a particular call agent login profile, the server stored with the matching login information may transmit application screens and/or webpages, which may be displayed by the client application 266 as shown in FIG. 2B, and/or which may include the secure data files that the call agent has or possesses permission to access. The method may include additional, fewer, or alternative actions, including those discussed elsewhere herein.

B. Exemplary Contact Center Login Display

FIG. 3B depicts an exemplary contact center login display 320, which may be generated by the CTI server device 110 and displayed by the client application 266 of one of the contact center devices 152-158. As will be appreciated by those of ordinary skill in the relevant art(s), the exemplary display shown in FIG. 3B is for illustrative purposes, and the associated functionality may be implemented using any suitable format and/or design for facilitating corresponding described functionalities without departing from the spirit and scope of the present disclosure.

The contact center login display 320 may include a user control 322 for entering call agent login information, such as a free-form text field, drop-down menu, etc. The call agent login information entered on the contact center login display 320 may be a phone number, username, and/or password. In some embodiments, the call agent login information may be pre-filled for the call agent on the call agent's contact center device.

The call agent may also select the user control "Set Default PG" 324, for example, by clicking on the corresponding check box. By clicking on the corresponding check box, the call agent may designate the entered call agent login information as default call agent login information in the event that the call agent has multiple call agent profiles corresponding to multiple sets of call agent login information. When the call agent attempts to login to the CTI system in the future, the default call agent login information may be pre-filled on the call agent's contact center device, and/or the contact center device may automatically login using the default call agent login information.

In any event, once the call agent login information is entered, the call agent may select an "OK" button 326 to login to her call agent profile. As described above, the LM 120 may compare the received call agent login information entered via the user control 322, to the sets of call agent login information stored in the contact center login database 124. If there is a match, the LM 120 may retrieve the indication of the corresponding server stored with the matching login information, and/or establish a communication between the call agent and the corresponding server, for example, via the contact center network 150. The call agent may then access her call agent profile via the corresponding server.

C. Exemplary Contact Center Login Selection Screen

If a call agent has previously entered multiple sets of call agent login information, the CTI server device 110 may provide a contact center login selection screen for the call agent to select from the multiple sets of call agent login information. FIG. 3C depicts an exemplary contact center login selection screen 340, which may be generated by the CTI server device 110 and displayed by the client application 266 of one of the contact center devices 152-158. As will be appreciated by those of ordinary skill in the relevant art(s), the exemplary display shown in FIG. 3C is for illustrative purposes, and the associated functionality may be implemented using any suitable format and/or design for facilitating corresponding described functionalities without departing from the spirit and scope of the present disclosure.

The contact center login selection screen 340 may include a user control 342, such as a drop-down menu, for selecting call agent login information from multiple sets of call agent login information for a user. For example, if a call agent has previously logged into the CTI system using a first phone number "555-555-5511" corresponding to a first call agent profile, using a second phone number "555-555-5522" corresponding to a second call agent profile, and using a third phone number "555-555-5533" corresponding to a third call agent profile, each of the three phone numbers may be displayed via the drop-down menu when the call agent selects the user control 342.

The call agent may then select one of the sets of call agent login information displayed on the drop-down menu, and/or may select an "OK" button 344 to login to the call agent profile corresponding to the selected set of login information. As described above, the LM 120 may compare the selected call agent login information via the user control 342, to the sets of call agent login information stored in the contact center login database 124. If there is a match, the LM 120 may retrieve the indication of the corresponding server stored with the matching login information, and/or establish a communication between the call agent and the corresponding server, for example, via the contact center network 150. The call agent may then access the corresponding call agent profile via the corresponding server.

IV. EXEMPLARY CONTACT CENTER ENVIRONMENT

A. Exemplary Contact Center Directory Display

Figure 4A:
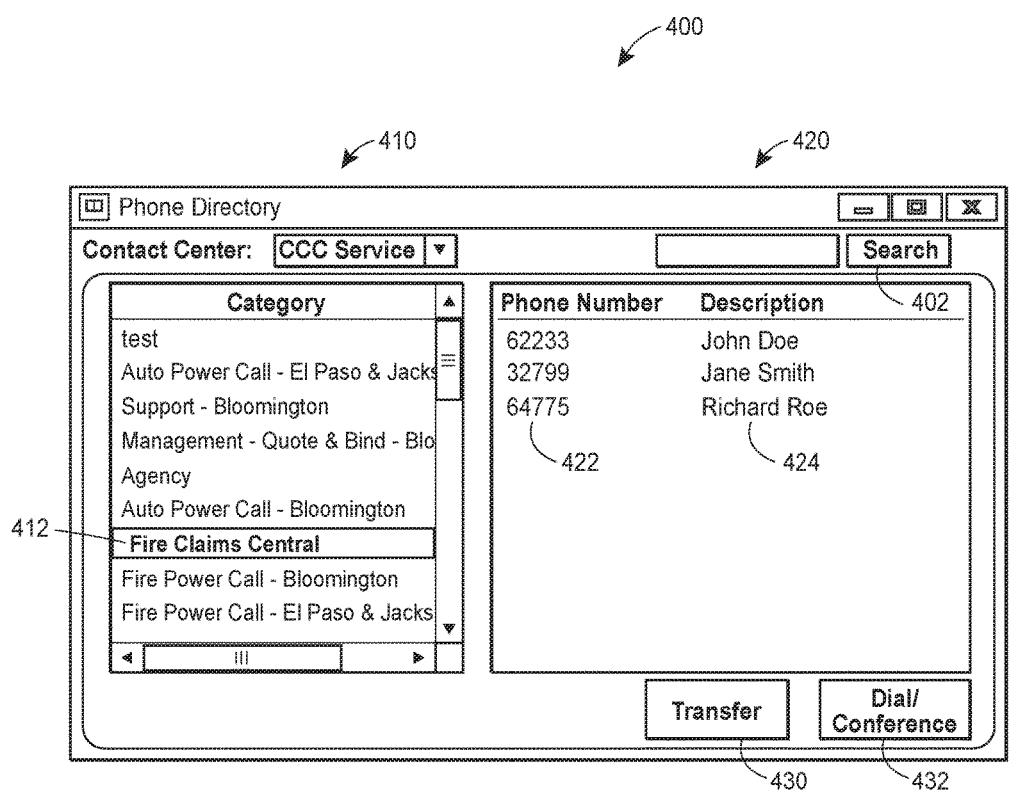
FIG. 4A depicts an exemplary contact center directory display in accordance with an exemplary aspect of the present disclosure.

FIG. 4A depicts an exemplary contact center directory display 400, which may be generated by the CTI server device 110 and displayed by the client application 266 of one of the contact center devices 152-158. As will be appreciated by those of ordinary skill in the relevant art(s), the exemplary display shown in FIG. 4A is for illustrative purposes, and the associated functionality may be implemented using any suitable format and/or design for facilitating corresponding described functionalities without departing from the spirit and scope of the present disclosure.

The contact center directory display 400 may include indications of contact center service categories 410, and for each contact center service category, sets of contact information 420 including a phone number 422 and/or a name of the call agent 424 corresponding to the phone number. Moreover, the contact center directory display 400 may include a user control for transferring a call to the selected call agent, for example by touch-selecting and/or double clicking on the "Transfer" button 430. The contact center directory display 400 may also include a user control for dialing and/or establishing a conference call between the selected call agent, the user, and the customer, for example by touch-selecting and/or double clicking on the "Dial/Conference" button 432. A "Search" field 402 may also be displayed for entering text to search for a particular contact center service category, and/or a particular set of contact information, such as a call agent name or phone number.

When the user (the call agent) selects one of the contact center service categories from the indications of contact center service categories 410, the selected contact center service category may be highlighted on the contact center directory display 400, such as the "Fire Claims Central" contact center service category 412. Sets of contact information for each call agent assigned to the selected contact center service category may be displayed, such as "62233—John Doe," "32799—Jane Smith," etc. When the call agent selects another contact center service category, such as "Agency," sets of contact information for call agents assigned to "Agency" may be displayed as the sets of contact information 420.

In some embodiments, the user (the call agent) may view and/or access contact center service categories on the contact center directory display 400 based upon the security groups to which the user belongs. For example, one security group may have permission to access all contact center service categories related to Bloomington, such as "Support—Bloomington," "Auto Power Call—Bloomington," "Fire Power Call—Bloomington," etc. All call agents who need to communicate with the Bloomington branch may belong to such a security group, and therefore may view and/or access these contact center service categories on the contact center directory display 400. On the other hand, a call agent who is not a member of this security group, and is not a member of any security group which has or possesses permission to access "Support—Bloomington," may not view and/or access the "Support—Bloomington" contact service category on the contact center directory display 400.

Also, in some embodiments, a system administrator may view each of the contact center service categories and corresponding sets of contact information for the contact center service categories on a system administrator directory display (e.g., such as the system administrator directory category displays 434, 440, 460, and 480 as shown in FIGS. 4B-E, respectively, below), which may be generated by the CTI server device 110 and displayed by the client application 266 of the system administrator's contact center device. The system administrator may be able to edit each of the contact center service categories and corresponding sets of contact information for the contact center service categories via one or more user controls on the system administrator directory display, such as an add category button, a delete category button, an assign phone number button, an add phone number button, a delete phone number button, etc.

Using the user controls, the system administrator may add a set of contact information to the contact center directory database 128; remove a set of contact information from the contact center directory database 128; assign a set of contact information to a contact center service category in the contact center directory database 128, such that the set of contact information may be displayed when a call agent selects the assigned contact center service category; and/or remove an association between a set of contact information and a contact center service category in the contact center directory database 128, such that the set of contact information may not be displayed when a call agent selects the previously assigned contact center service category. The system administrator may also be able to make any other suitable edits to the contact center service categories and corresponding sets of contact information in any suitable manner.

When a set of contact information is updated, removed, and/or added to a particular contact center service category by the system administrator, all call agents with permission to access the particular contact center service category may view the change on their respective displays. For example, if a system administrator removes the "Richard Roe" entry from the "Fire Claims Central" contact center service category 412, all call agents with permission to access "Fire Claims Central" may view the updated sets of contact information for "Fire Claims Central" without contact information for Richard Roe.

When the system administrator removes the "Richard Roe" entry from the "Fire Claims Central" contact center service category 412, the association between "Richard Roe" and the "Fire Claims Central" contact center service category may be removed from the contact center directory database 128, as shown in FIG. 1. Additionally, the system administrator may remove the "Richard Roe" entry from all contact center service categories which Richard Roe is assigned, by removing the "Richard Roe" entry from the contact center directory database 128. For example, after selecting a delete button on the system administrator display, the system administrator may be presented with the option to either remove an association between the "Richard Roe" entry and a contact center service category or to delete the "Richard Roe" entry from the contact center directory database 128. For example, if Richard Roe leaves the organization, rather than removing the association between the "Richard Roe" entry and a particular contact center service category, the system administrator may delete the "Richard Roe" entry from the contact center directory database 128 entirely.

In another example, the system administrator may update the set of contact information for Richard Roe (e.g., change his phone number) for a particular contact center service category in which Richard Roe is assigned, and the updated set of contact information may be stored in the contact center directory database 128. As a result, the updated set of contact information for Richard Roe may automatically be displayed for each contact center service category in which Richard Roe is assigned. The CTI server device 110 may generate a new contact center directory display based upon the updated database information. The new contact center directory display may be displayed by the client application 266 of each respective call agent's contact center device.

In yet another example, the system administrator may add a set of contact information (e.g., by selecting an add button and manually entering in the set of contact information). When the system administrator adds a set of contact information, she may also select one or several contact center service categories which may be assigned to the set of contact information. The CTI server device 110 may then receive the added set of contact information and assigned contact center service categories. As a result, the CTI server device 110 may store the added set of contact information in the contact center directory database 128. The CTI server device 110 may also store references to the added set of contact information for each of the assigned contact center service categories.

While the contact center directory display 400 includes three sets of contact information for the "Fire Claims Central" contact center service category, this is merely for ease of illustration only. The contact center directory display 400 may include any suitable number of contact center service categories, and sets of contact information for each contact center service category.

B. Exemplary System Administrator Directory Display for Editing Contact Center Service Categories FIG. 4B depicts a first exemplary system administrator directory display 434, which may be generated by the CTI server device 110 and displayed by the client application 266 of one of the contact center devices 152-158 for a system administrator. As will be appreciated by those of ordinary skill in the relevant art(s), the exemplary display shown in FIG. 4B is for illustrative purposes, and the associated functionality may be implemented using any suitable format and/or design for facilitating corresponding described functionalities without departing from the spirit and scope of the present disclosure.

The first system administrator directory display 434 may include an "Add Category" button 436, and/or a "Delete Category" button 438. If the system administrator selects the "Delete Category" button 438, the CTI server device 110 may remove the contact center service category, such as "Auto Claims Central" 439, from the contact center directory database 128, and call agents who previously had permission to access the contact center service category may no longer view and/or access the contact center service category once it is removed.

If a system administrator selects the "Add Category" button 436, the system administrator may be prompted to enter a contact center service category name, for example, via a free-form text field, such as "Auto Claims Central" 439. As mentioned above, CTI server device 110 may store the added category in the contact center directory database 128, and the system administrator may be provided with a display for assigning sets of contact information to the added category, as shown in FIG. 4C.

C. Exemplary System Administrator Directory Display for Assigning Contact Information FIG. 4C depicts a second exemplary system administrator directory display 440, which may be generated by the CTI server device 110 and displayed by the client application 266 of one of the contact center devices 152-158 for a system administration. As will be appreciated by those of ordinary skill in the relevant art(s), the exemplary display shown in FIG. 4C is for illustrative purposes, and the associated functionality may be implemented using any suitable format and/or design for facilitating corresponding described functionalities without departing from the spirit and scope of the present disclosure.

The second system administrator directory display 440 may include an indication of a contact center service category "Bob's Auto Shop" 442, and/or one or more user controls 444-448, such as check boxes, for assigning sets of contact information to the contact center service category. For example, by selecting the checkbox 444, the set of contact information including phone number "12345" and call agent "Alex Smith" may be assigned to "Bob's Auto Shop" 442. Moreover, by selecting the checkbox 446, the set of contact information including phone number "54321" and call agent "Bill Jacobs" may also be assigned to "Bob's Auto Shop" 442. Furthermore, by selecting the checkbox 448, the set of contact information including phone number "99999" and call agent "Jerry Thomas" may be assigned to "Bob's Auto Shop" 442.

As mentioned above, when a set of contact information is assigned to a contact center service category, the CTI server device 110 may store a reference to the set of contact information with the contact center service category in the contact center directory database 128. In the example above, references to: the set of contact information including phone number "12345" and call agent "Alex Smith," the set of contact information including phone number "54321" and call agent "Bill Jacobs," and/or the set of contact information including phone number "99999" and call agent "Jerry Thomas" may be stored with "Bob's Auto Shop" in the contact center directory database 128.

If the system administrator does not select the user control corresponding to a set of contact information on the second system administrator directory display 440, the set of contact information may not be assigned to the contact center service category.

Figure 4D:
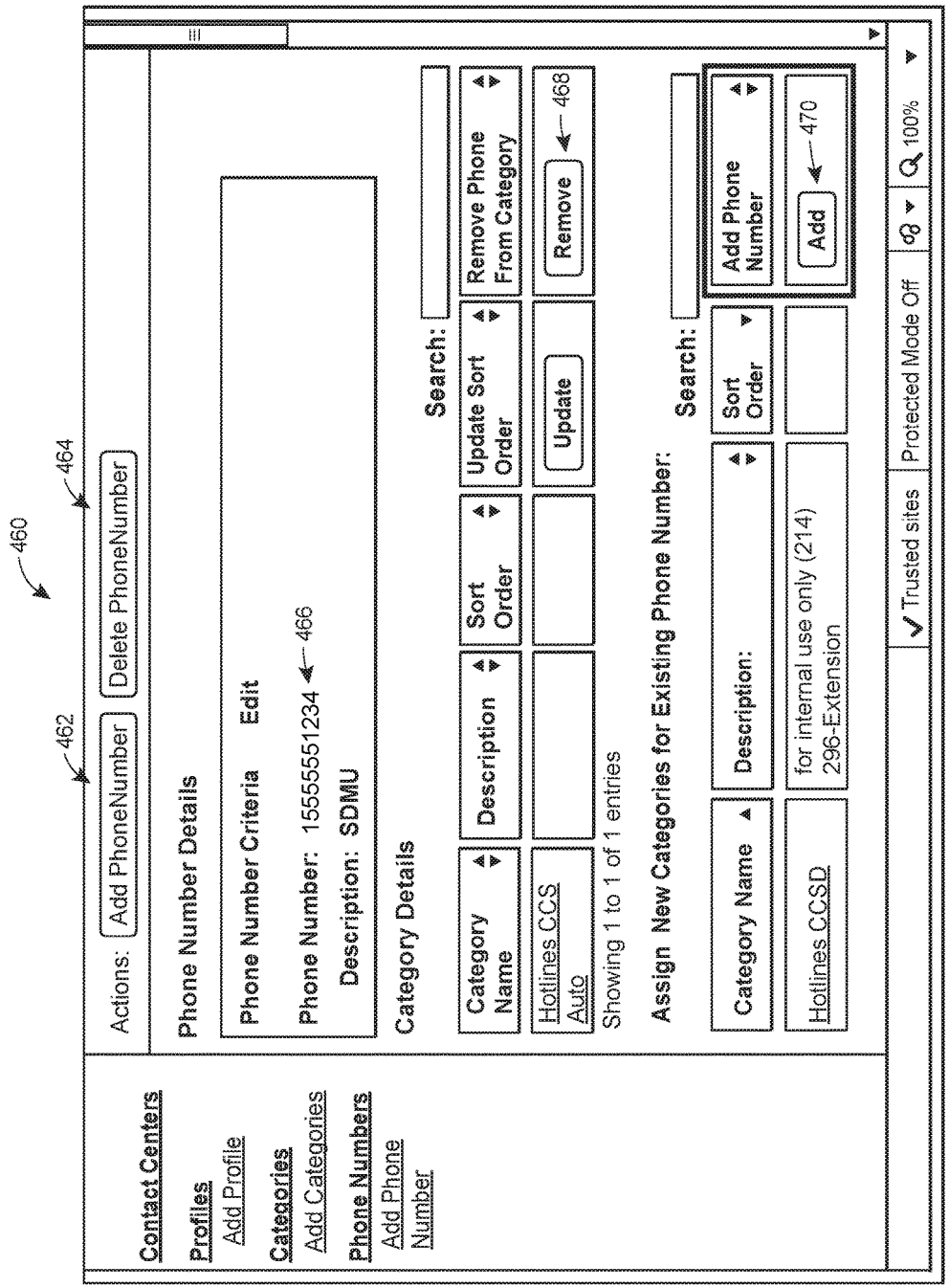
FIG. 4D depicts a third exemplary system administrator directory display for removing contact information from a contact center service category in accordance with an exemplary aspect of the present disclosure.

While the second system administrator directory display 440 includes seven sets of contact information, this is merely for ease of illustration only. The second system administrator directory display 440 may include any suitable number of sets of contact information which a system administrator may assign to a particular contact center service category. In addition to assigning a set of contact information to a contact center service category, an association between a set of contact information and a contact center service category may be removed, a set of contact information may be deleted from the contact center directory database 128, entirely, and/or a set of contact information may be added to the contact center directory database 128 and/or assigned to contact center service categories. FIG. 4D depicts a third system administrator directory display for removing an association between a set of contact information and a contact center service category, deleting a set of contact information, and/or assigning a set of contact information to a contact center service category.

D. Exemplary System Administrator Directory Display for Removing Contact Information FIG. 4D depicts a third exemplary system administrator directory display 460, which may be generated by the CTI server device 110 and displayed by the client application 266 of one of the contact center devices 152-158 for a system administrator. As will be appreciated by those of ordinary skill in the relevant art(s), the exemplary display shown in FIG. 4D is for illustrative purposes, and the associated functionality may be implemented using any suitable format and/or design for facilitating corresponding described functionalities without departing from the spirit and scope of the present disclosure.

The third system administrator directory display 460 may include an "Add Phone Number" button 462, and/or a "Delete Phone Number" button 464. Additionally, for a selected set of contact information, such as "15555551234—SDMU" 466, the third system administrator directory display 460 may include a "Remove" button 468 to remove an association between the set of contact information and a contact center service category, such as "Hotlines CCS Auto." Moreover, the third system administrator directory display 460 may include an "Add" button 470 to assign the set of contact information to a contact center service category such as "Hotlines CCSD."

If the system administrator selects the "Delete Phone Number" button 464, the CTI server device 110 may delete the set of contact information from the contact center directory database 128. Each contact center service category assigned to the deleted set of contact information, may no longer display the set of contact information on the contact center directory display 400 as shown in FIG. 4A.

If the system administrator selects the "Remove" button 468, the CTI server device 110 may remove the association between the set of contact information 466 and the contact center service category "Hotlines CCS Auto" in the contact center directory database 128, by removing the reference to the set of contact information 466 stored with the "Hotlines CCS Auto" contact center service category in the contact center directory database 128, as described above. The contact center directory display 400 may no longer display the set of contact information 466 when a call agent selects the "Hotlines CCS Auto" category.

Furthermore, if the system administrator selects the "Add" button 470, the CTI server device 110 may assign the set of contact information 466 to the contact center service category "Hotlines CCSD" in the contact center directory database 128, by including a reference to the set of contact information 466 and/or storing the reference with the "Hotlines CCD" contact center service category in the contact center directory database 128, as described above.

The contact center directory display 400 may display the set of contact information 466 when a call agent selects the "Hotlines CCSD" category.

While the third system administrator directory display 460 includes one contact center service category for removing an association with the set of contact information, and one contact center service category for assigning the set of contact information, this is merely for ease of illustration only. The third system administrator directory display 460 may include any suitable number of contact center service categories for adding and/or removing an association with the set of contact information.

Moreover, if the system administrator selects the "Add Phone Number" button 462, the CTI server device 110 may provide the fourth system administrator directory display 480 as shown in FIG. 4E to the system administrator's contact center device.

E. Exemplary System Administrator Directory Display for Adding Contact Information FIG. 4E depicts a fourth exemplary system administrator directory display 480, which may be generated by the CTI server device 110 and displayed by the client application 266 of one of the contact center devices 152-158 for a system administrator. As will be appreciated by those of ordinary skill in the relevant art(s), the exemplary display shown in FIG. 4E is for illustrative purposes, and the associated functionality may be implemented using any suitable format and/or design for facilitating corresponding described functionalities without departing from the spirit and scope of the present disclosure.

As mentioned above, if the system administrator selects the "Add Phone Number" button 462, the CTI server device 110 may provide the fourth system administrator directory display 480 for the system administrator to add a set of contact information to the contact center directory database 128, and/or to assign the added set of contact information to one or several contact center service categories. The fourth system administrator directory display 480 may include a user control 482, such as a free-form text field for entering a phone number (e.g., "15553467821"). A user control 484 may also be included for adding a description to the phone number, such as a name of the call agent corresponding to the phone number.

Moreover, the fourth system administrator directory display 480 may include one or several user controls for assigning contact center service categories to the added set of contact information. For example, the user controls may be a free-form text field(s) for entering the assigned contact center service categories, a drop-down menu(s) for selecting contact center service categories to assign to the added set of contact information, and/or several checkboxes where selecting a checkbox assigns the corresponding contact center service category to the added set of contact information. A "Search" field 486 may also be displayed for entering text to search for a particular contact center service category.

The fourth system administrator directory display 480 may include a checkbox 488 for assigning a "Voicemail" category to the added set of contact information, a checkbox 490 for assigning an "Agency" category to the added set of contact information, a checkbox 492 for assigning a "Bob's Auto Shop" category to the added set of contact information, etc. By checking the checkbox 492 for assigning a "Bob's Auto Shop" category to the added set of contact information and/or selecting the "Save" button 494 (e.g., by single or double clicking and/or touch-selecting the "Save" button 494), the set of contact information including the phone number 482 and/or description 484 may be added to the contact center directory database 128 by the CTI server device 110. Moreover, the CTI server device 110 may store a reference to the added set of contact information with the "Bob's Auto Shop" contact center service category in the contact center directory database 128. If a checkbox is not selected when the system administrator single or double clicks and/or touch-selects the "Save" button 494, then the contact center service category corresponding the checkbox may not be assigned to the added set of contact information.

While the fourth system administrator directory display 480 includes seven contact center service categories for assigning to the added set of contact information, this is merely for ease of illustration only. The fourth system administrator directory display 480 may include any suitable number of contact center service categories for assigning to the set of contact information.

V. EXEMPLARY FLOW DIAGRAM FOR A CONTACT CENTER DIRECTORY DATABASE

Figure 5:
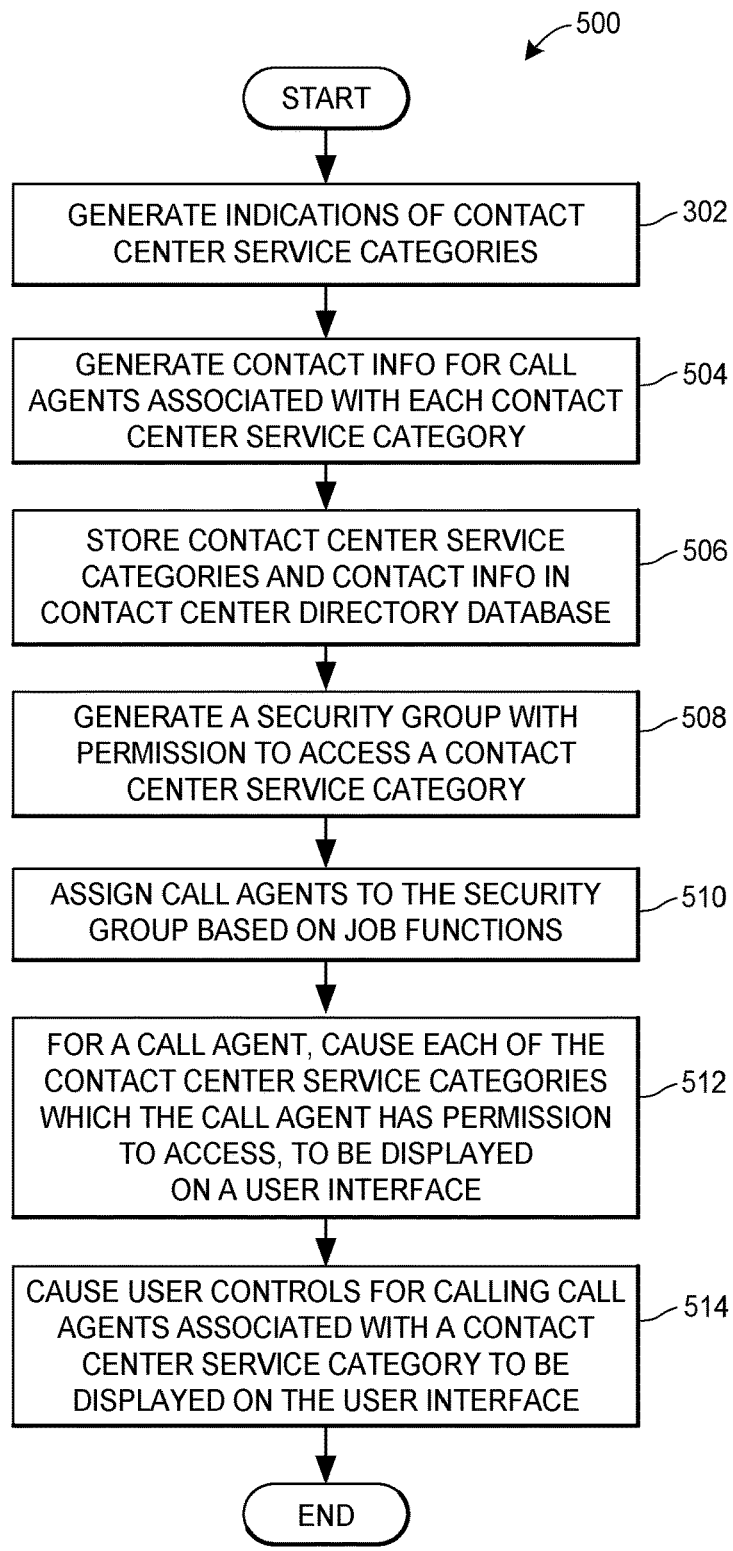
FIG. 5 depicts a flow diagram representing an exemplary method for generating and/or accessing a contact center directory database in accordance with an exemplary aspect of the present disclosure.

FIG. 5 depicts a flow diagram representing an exemplary method 500 for generating and/or accessing a contact center directory database. The method 500 may be executed on the CTI server device 110. In some embodiments, the method 500 may be implemented in a set of instructions stored on a non-transitory computer-readable memory and executable on one or more processors of the CTI server device 110. For example, the method 500 may be performed by the directory module 122 of FIG. 1.

At block 502, the DM 122 may generate indications of contact center service categories, which may be based upon a division and/or geographic location within the organization. For example, contact center service categories may include, "Support—Bloomington," "Management—Quote & Bind—Bloomington," "Agency," "Auto Power Call—Bloomington," "Fire Power Call—Bloomington," "Fire Power Call—El Paso & Jacksonville," etc.

At block 504, the DM 122 may generate sets of contact information for contacting call agents assigned to each contact center service category. For example, in the contact center directory display 400 as shown in FIG. 4A, the DM 122 may generate "62233—John Doe," "32799—Jane Smith," and/or "64775—Richard Roe," and assign each set of contact information to the "Fire Claims Central" contact center service category. Call agents assigned to a particular contact center service category may be determined by identifying a division, geographic location, and/or a job function associated with each call agent, for example based upon the respective call agent's call agent profile, security groups, and/or permissions. In another example, the DM 122 may obtain personal and/or business information for each call agent from the CTI server device 110, to identify call agents who may be assigned to the respective contact center service category.

The contact center service categories and respective sets of contact information for each contact center service category may be stored in a database, such as the contact center directory database 128 as shown in FIG. 1 (block 506). For example, an indication of each contact center service category may be stored in the contact center directory database 128 with references to each set of contact information assigned to the respective contact center service category. The sets of contact information may also be stored in the contact center directory database 128.

In this manner, when a set of contact information is removed and/or updated, for example, by a system administrator, the change may be reflected in every contact center service category assigned to the set of contact information, because each contact center service category is stored with a reference to the updated/removed set of contact information. If a system administrator removes the set of contact information from one particular contact center service category, the reference to the set of contact information for the particular contact center service category may be removed from the contact center directory database 128, but the set of contact information may remain unchanged. Moreover, if the system administrator adds a set of contact information, a single instance of the added set of contact information may be stored in the contact center directory database 128. References to the added set of contact information may be stored with each contact center service category that the system administrator assigns to the added set of contact information.

In addition to storing contact center service categories and respective sets of contact information for each contact center service category, one or several security groups may be generated, where each security group may have permission to access contact center service categories (block 508). For example, security group A may have permission to access "Support Bloomington," "Management—Quote & Bind—Bloomington," and/or "Agency," as well as the sets of contact information assigned to each respective contact service category. Security group B may have permission to access "Auto Power Call—Bloomington," "Fire Power Call—Bloomington," and/or "Fire Power Call—El Paso & Jacksonville," as well as the sets of contact information assigned to each respective contact service category.

Call agents may then be assigned to security groups based upon their respective job functions and/or geographic locations (block 510), for example according to their respective call agent profiles. For example, call agents who respond to inquiries regarding "Fire Power Call—Las Vegas," may be assigned to security group B so that they may transfer calls to call agents assigned to "Fire Power Call—Bloomington," and/or "Fire Power Call—El Paso & Jacksonville," when they receive calls regarding these geographic locations. In some embodiments, a system administrator may assign call agents to the various security groups.

In any event, at block 512, the CTI server device 110 and/or the DM 122 may cause each of the contact center service categories and assigned sets of contact information which a particular call agent has or possesses permission to access to be displayed on a user interface of the call agent's contact center device. Additionally, user controls for transferring, dialing, and/or conferencing call agents assigned to each of the contact center service categories may be displayed on the user interface of the call agent's contact center device (block 514). For example, the contact center directory display 400 may be displayed by the client application 266 of the call agent's contact center device. The method may include additional, fewer, or alternative actions, including those discussed elsewhere herein.

VI. EXEMPLARY CONTACT CENTER CUSTOMER CALL INFORMATION ENVIRONMENT

A. Exemplary Flow Diagram for Contact Center Customer Call Information Database

Figure 6A:
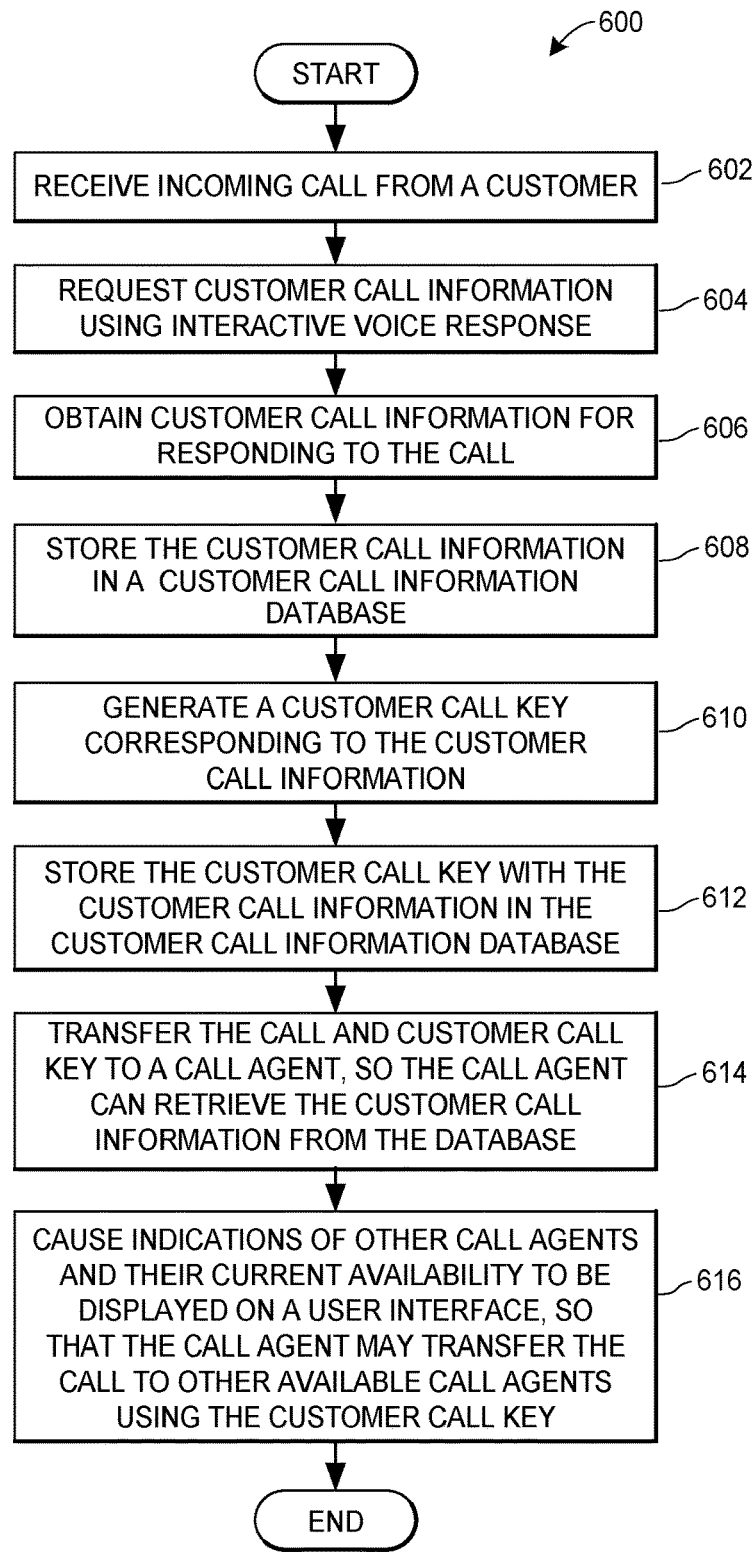
FIG. 6A depicts a flow diagram representing an exemplary method for generating and/or accessing a contact center customer call information database in accordance with an exemplary aspect of the present disclosure.

FIG. 6A depicts a flow diagram representing an exemplary method 600 for generating and/or accessing a contact center customer call information database. The method 600 may be executed on the CTI server device 110. In some embodiments, the method 600 may be implemented in a set of instructions stored on a non-transitory computer-readable memory and executable on one or more processors of the CTI server device 110. For example, the method 600 may be performed by the IVR 116 and/or the customer call information module 118 of FIG. 1.

At block 602, an incoming call may be received at the CTI server device 110 from a customer via the network 130. In response to the incoming call, the IVR module 116 may request customer call information (block 604), through a series of questions which the customer may answer by dialing numbers on the keypad of the customer telephone device that was used to make the call, and/or by providing voice responses. In some embodiments, the IVR module 116 may provide additional requests based upon the customer's response. For example, the IVR module 116 may state, "If you are calling to file an insurance claim, press '1'." If the customer presses '1' on the customer telephone device, the IVR module 116 may then state "Please enter your policy number using your keypad."

In other embodiments, a call agent may communicate with the customer through a series of questions and/or receive voice responses for the customer. The call agent may then provide additional requests based upon the customer's responses and/or record the customer's responses at the call agent's contact center device.

At block 606, the CCIM 118 may obtain the customer call information from the IVR module 116 and/or the call agent. The customer call information may include identification information for the customer, such as the customer's name, address, phone number, etc. The customer call information may also include the subject of the customer's inquiry, such as filing a claim, purchasing an insurance policy, policy coverage information, receiving a quote, billing questions, etc. Moreover, the customer call information may include the type of insurance policy owned by the customer, such as life insurance or homeowner's insurance, a policy number for the insurance policy, a group number for the insurance policy, etc.

In some embodiments, at least some of the customer call information may be determined by the CCIM 118. For example, the customer's phone number may be obtained automatically when the customer makes the call without a request for this information from the IVR module 116. Moreover, the CCIM 118 may access a customer database that may include personal information for customers who have previously purchased insurance policies with the insurance provider. For example, the customer database may store a customer name, phone number, address, and/or policy numbers for each of the insurance policies purchased by each customer. As mentioned above, the CCIM 118 may automatically obtain the customer's phone number when the customer calls the scalable CTI system 100, and may compare the phone number to phone numbers within the customer database. If there is a match, the CCIM 118 may obtain personal information for the customer without a request for this information from the IVR module 116.

In any event, the customer call information may be stored in a database, such as the contact center customer call information database 126 (block 608). Additionally, the CCIM 118 may generate a customer call key (block 610), which may be associated with the customer call information and/or stored in the contact center customer call information database 126 as a reference to the customer call information (block 612). For example, the customer call key may be a set of alphanumeric and/or numeric characters (e.g., an eight digit alphanumeric character string), and/or may be stored in the contact center customer call information database 126, such that when the customer call key is searched in the database, the associated customer call information may be retrieved.

At block 614, the CCIM 118 may transfer the incoming call to a call agent, and may also transfer the customer call key to the call agent without transferring the customer call information. In some embodiments, the CCIM 118 may select a call agent for transferring the call based upon the call agent's profile. For example, if the customer indicates that she would like to discuss an insurance claim, the CCIM 118 may transfer the call to a call agent having a call agent profile associated with insurance claims (e.g., a call agent profile which belongs to security groups that have permission to access insurance claims data). When the call is transferred to the call agent, a call agent display may be displayed on a user interface of the call agent's contact center device. The call agent display may be the call agent display 620 as described in more detail below with reference to FIG. 6B, may be displayed by the client application 266 of the call agent's contact center device, and/or may include the customer call key. When the call agent receives the customer call key, the call agent and/or system/server may retrieve the customer call information for the incoming call by searching for the customer call key in the contact center customer call information database 126 and/or otherwise by using the customer call key.

Additionally, the CTI server device 110 and/or the CCIM 118 may cause indications of other call agents and/or their current availability statuses to be displayed on a user interface of the call agent's contact center device (block 616). For example, the presence display 700 may be displayed by the client application 266 of the call agent's contact center device, as described in more detail below with reference to FIG. 7.

The CTI server device 110 may receive the availability status of each call agent within the contact center network 150 from each of the contact center devices 152-158, and/or display the availability statuses of the other call agents so that the call agent may determine which other call agents are available for transferring the call and/or for a conference call. For example, if the call agent retrieves contact information for Jane Smith from the contact center directory display 400 of FIG. 4A, she may determine whether Jane Smith is available based upon the current availability status for Jane Smith. If Jane Smith is available, the call agent may transfer the call and/or transmit the call key to Jane Smith, so that she may retrieve customer call information for the incoming call. The method may include additional, fewer, or alternative actions, including those discussed elsewhere herein.

B. Exemplary Call Agent Display

Figure 6B:
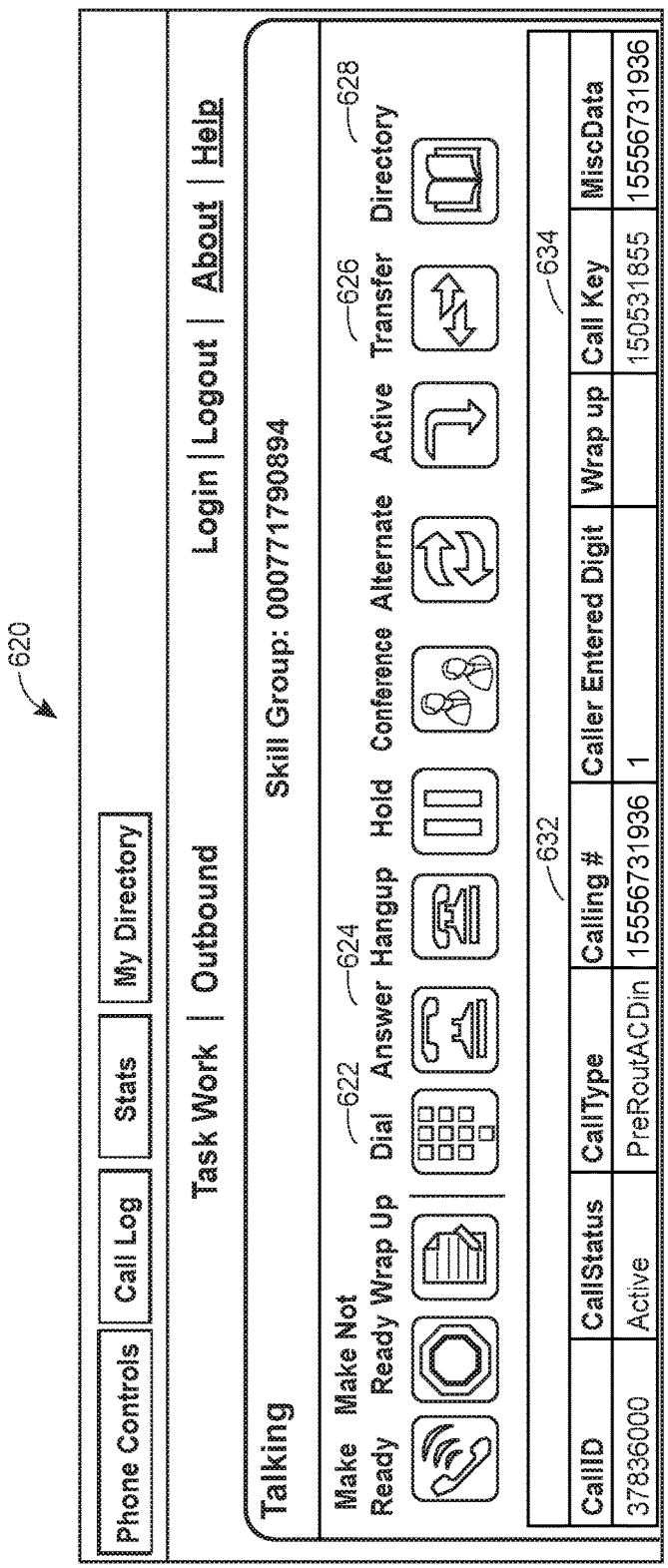
FIG. 6B depicts an exemplary call agent display screen in accordance with an exemplary aspect of the present disclosure.

FIG. 6B depicts an exemplary call agent display 620, which may be generated by the CTI server device 110 and displayed by the client application 266 of one of the contact center devices 152-158. As will be appreciated by those of ordinary skill in the relevant art(s), the exemplary display shown in FIG. 6B is for illustrative purposes, and the associated functionality may be implemented using any suitable format and/or design for facilitating corresponding described functionalities without departing from the spirit and scope of the present disclosure.

The call agent display 620 may include a "Dial" button 622 for making an outgoing call to another call agent, and/or an "Answer" button 624 for receiving an incoming call from a customer and/or receiving a transferred call from another call agent and/or the CTI system. The call agent display 620 may also include a "Transfer" button 626 for transferring a customer call to another call agent and/or a "Directory" button 628 for displaying a contact center directory such as the contact center directory display 400 as shown in FIG. 4A. The call agent may then dial, conference, and/or transfer the customer call to another call agent using the sets of contact information presented in the contact center directory display 400.

In addition to the various buttons, the call agent display 620 may also include information regarding the customer call such as an identification number assigned by the CTI system for the call, a current status of the call such as "Active," "Held," etc., the phone number of the customer 632, "15556731936," and/or a customer call key 634 associated with customer call information for the customer call. In some embodiments, the call agent and/or the CTI server device 110 may retrieve the customer call information by searching for the customer call key in the contact center customer call information database 126. The CTI server device 110 may locate the customer call information referenced by the customer call key in the contact center customer call information database 126 and/or display the customer call information on the call agent's contact center device.

In response to receiving an incoming call, for example from a customer and/or another call agent, the call agent may activate the "Answer" button 624, for example by touch-selecting and/or single or double clicking on the "Answer" button 624 to answer the incoming call. When the call agent activates the "Dial" button 622, for example by touch-selecting and/or single or double clicking on the "Dial" button 622, a keypad may be displayed on the call agent's contact center device for dialing a phone number. In this manner, the call agent may place an outgoing phone call and/or initiate a conference call via the call agent display 620. Similarly, when the call agent activates the "Transfer" button 626, for example by touch-selecting and/or single or double clicking on the "Transfer" button 626, a keypad may be displayed on the call agent's contact center device for dialing a phone number. In this manner, the call agent may transfer a phone call to the dialed phone number via the call agent display 620.

Additionally and/or alternatively, the call agent may transfer the phone call and/or establish a conference call via the "Directory" button 628. When the call agent activates the "Directory" button 628, for example by touch-selecting and/or single or double clicking on the "Directory" button 628, a display such as the contact center directory display 400 as shown in FIG. 4A may be presented on the call agent's contact center device. As described above with reference to FIG. 4A, the contact center directory display 400 may include indications of contact center service categories, and for each contact center service category, sets of contact information including a phone number and/or a name of the call agent corresponding to the phone number. Moreover, the contact center directory display 400 may include a user control for transferring a call to the selected call agent, for example by touch-selecting and/or double clicking on the "Transfer" button. The contact center directory display 400 may also include a user control for dialing and/or establishing a conference call between the selected call agent, the call agent, and the customer, for example by touch-selecting and/or double clicking on the "Dial/Conference" button.

While the call agent display 620 includes twelve buttons, this is merely for ease of illustration only. The call agent display 620 may include additional and/or alternative buttons for receiving, dialing, transferring, conferencing a customer call and/or for communicating with the customer.

VII. EXEMPLARY PRESENCE DISPLAY

Figure 7:
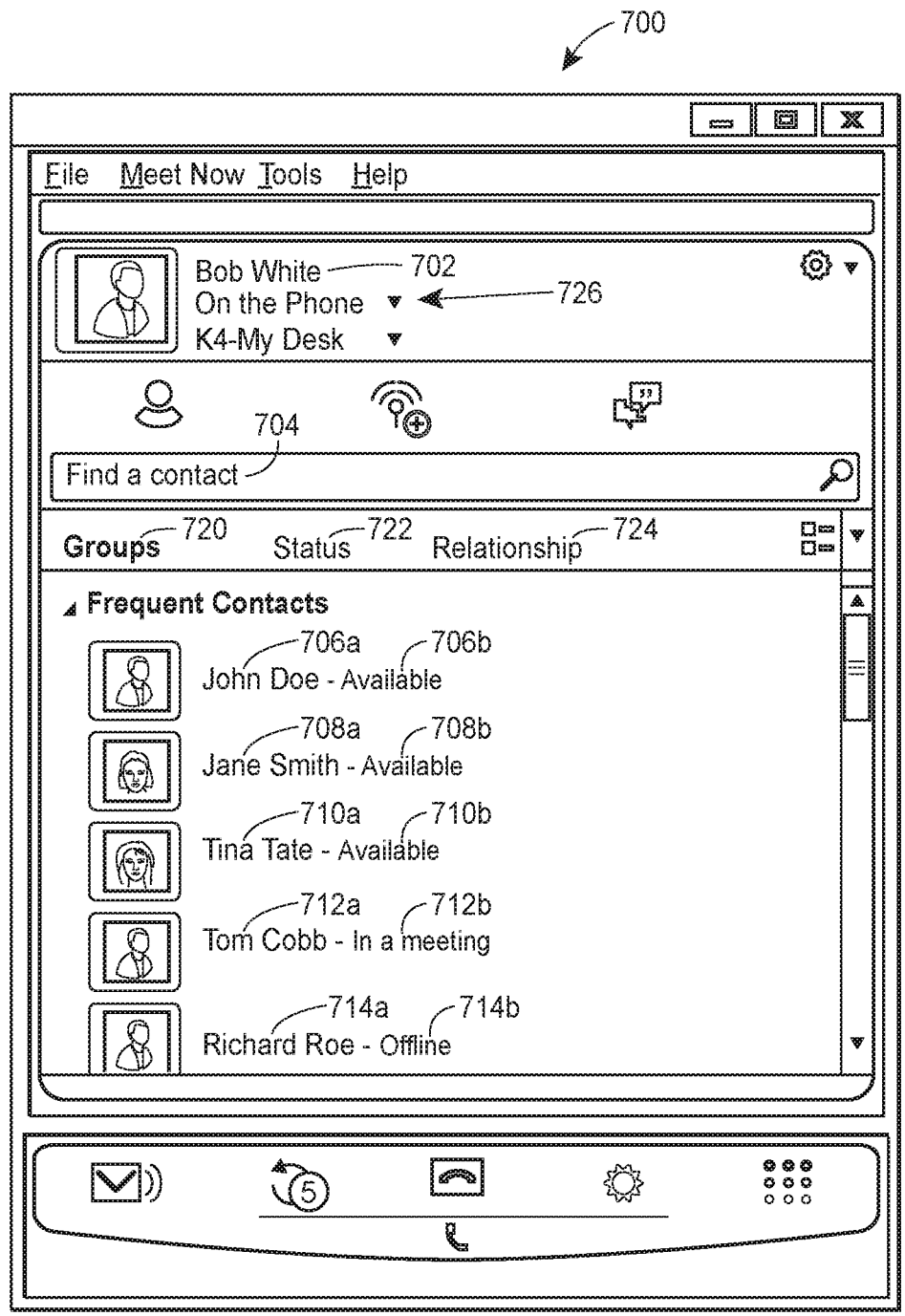
FIG. 7 depicts an exemplary presence display in accordance with an exemplary aspect of the present disclosure.

FIG. 7 depicts an exemplary presence display 700 which may be generated by the CTI server device 110 and displayed by the client application 266 of one of the contact center devices 152-158. As will be appreciated by those of ordinary skill in the relevant art(s), the exemplary display shown in FIG. 7 is for illustrative purposes, and the associated functionality may be implemented using any suitable format and/or design for facilitating corresponding described functionalities without departing from the spirit and scope of the present disclosure.

The presence display 700 may include the name of the call agent viewing the presence display 700 (the viewing call agent) "Bob White" 702, and the names of other call agents in the contact center network 150, such as "John Doe" 706a, "Jane Smith" 708a, "Tina Tate" 710a, "Tom Cobb" 712a, and "Richard Roe" 714a. The presence display may also include indications of an availability status for each of the other call agents. For example, John Doe is "Available" 706b, Tom Cobb is "In a meeting" 712b, and Richard Roe is "Offline" 714b.

Additionally, the presence display 700 may include a search box 704 for entering a call agent's name to view the call agent's availability status. Moreover, the indications of other call agents may be sorted according to groups 720 such as "Frequent Contacts," may be sorted according to status 722 such as "Available," "In a meeting," "Offline," etc., and/or may be sorted according to relationship 724 such as "Manager," "Assistant," etc.

The CTI server device 110 may obtain an indication of availability status for each call agent via the call agent's call agent profile. For example, when a call agent is not logged into her call agent profile, the CTI server device 110 may generate an "Offline" indication for the call agent on the presence display 700. When the call agent logs into her call agent profile, the CTI server device 110 may obtain an indication that the call agent has logged in, and/or may automatically generate an "Available" indication for the call agent on the presence display 700. In some embodiments, the call agent may be able to set a default availability status such that when the call agent logs in or does not adjust her status, the CTI server device 110 may generate the default status when the call agent is not offline. In another example, when a call agent is on a telephone call, the CTI server device 110 may receive an indication that the call agent is on the telephone, such as a busy signal and/or any other suitable indication. As a result, the CTI server device 110 may automatically generate an "On the Phone" indication for the call agent on the presence display 700. When the call agent hangs up the telephone or ends the telephone call in any other suitable manner, the CTI server device 110 may receive an indication that the call agent is no longer on the telephone, such as a dial tone or any other suitable indicator. As a result, the CTI server device 110 may automatically generate an "Available" indication for the call agent on the presence display 700.

The call agent may also change her availability status based upon her current availability. For example, the presence display 700 may include a user control 726, such as a drop-down menu, for selecting an availability status from several availability statuses (such as "Available," "In a meeting," "On the Phone," "Out to Lunch," "Available for Urgent Communications Only," etc.). The viewing call agent (e.g., Bob White) may set a current availability status via the user control 726, and as a result, the CTI server device 110 may generate the current availability status for Bob White on other call agent's respective presence displays.

In some embodiments, the CTI server device 110 may generate names of call agents and indications of their respective availability status on the presence display 700, for call agents which the viewing call agent (e.g., Bob White) has permission to access, according to the security groups in which the viewing call agent belongs. For example, if Bob White belongs to a security group which has permission to access "Fire Claims Central," via his call agent profile, Bob White may view John Doe, Jane Smith, and Richard Roe on the presence display 700 and indications of their respective availability statuses. On the other hand, if Bob White does not belong to a security group that has permission to access "Fire Claims Central," and he does not belong to any security groups that would allow Bob to access contact information for any of these call agents then John Doe, Jane Smith, and Richard Roe and indications of their respective availability statuses may not appear on the presence display 700 for Bob White. In other embodiments, the CTI server device 110 may generate names of call agents and indications of their respective availability status on the presence display 700 for all call agents in the contact center network 150.

In an exemplary scenario, Bob White may receive an incoming call from a customer that is routed to him by the CTI server device 110. The CTI server device 110 may also transmit a customer call key associated with customer call information for the incoming call to Bob White's contact center device. When Bob receives the customer call key, he may retrieve the customer call information from the contact center customer call information database 126 to better assist the customer during the call. If Bob determines that another call agent may be more helpful in assisting the customer, he may look up contact information for another call agent using a contact center directory, such as the contact center directory display 400 as shown in FIG. 4A.

For example, Bob White may determine that a call agent in the "Fire Claims Central" contact center service category may be more helpful in assisting the customer, and accordingly, he may view contact information for John Doe, Jane Smith, and Richard Roe. Additionally, Bob may view each of their respective availability statuses on the presence display 700 and/or determine that John Doe and Jane Smith are available 706b, 708b, while Richard Roe is offline 714b. As a result, Bob may transfer the call to Jane Smith, by selecting the "Transfer" button 430 on the contact center directory display 400, and/or he may transmit the customer call key to Jane Smith via her phone number listed on the contact center directory display 400.

While the presence display 700 includes five call agents for the "Frequent Contacts" group, this is merely for ease of illustration only. The presence display 700 may include any suitable number of groups, statuses, relationships, etc., and any suitable number of call agents for each group, status and/or relationship.

VIII. EXEMPLARY METHOD FOR MANAGING A CONTACT CENTER DIRECTORY

In one aspect, a computer-implemented method for managing a contact center directory in a scalable computer-telephony integration system may be provided. The method may include: (1) generating (via one or more processors) a plurality of contact center service categories each corresponding to a particular type of contact center service in a computer-telephony integration system; for each of the plurality of contact center service categories: (2) generating (via the one or more processors) one or more sets of contact information for communicating with call agents assigned to the respective contact center service category; and/or (3) storing (via the one or more processors) the respective contact center service category along with a reference to each of the one or more sets of contact information assigned to the respective contact center service category in a database. The method may further include: for a call agent of the plurality of call agents: (4) presenting (via the one or more processors and/or wired or wireless communication and/or data transmission) one or more contact center service categories of the plurality of contact center service categories which the call agent has permission to access, and one or more sets of contact information assigned to each of the one or more contact center service categories on a display for use by the call agent; and/or (5) presenting (via the one or more processors and/or wired or wireless communication and/or data transmission) one or more user controls for transferring, dialing, or conferencing the call agents associated with the one or more sets of presented contact information on the display to facilitate efficiently transferring calls to call agents best suited for responding to an inquiry by a customer.

For each of the plurality of contact center service categories, the method may also include assigning (via the one or more processors) at least some of the plurality of call agents permission to access the respective contact center service category such that the at least some call agents may have permission to view the respective contact center service category and associated one or more sets of contact information for communicating with the call agents assigned to the respective contact center service category; and/or denying (via the one or more processors) access to the respective contact center service category for call agents who may not be assigned permission to access the respective contact center service category such that the unassigned call agents may not view the respective contact center service category and associated one or more sets of contact information for communicating with the call agents assigned to the respective contact center service category. The method may include additional, fewer, or alternative actions, including those discussed elsewhere herein.

For instance, the act of assigning, for each of the plurality of contact center service categories, at least some of the plurality of call agents permission to access the respective contact center service category may include generating (via the one or more processors) a security group which may include a plurality of users who belong to the security group, wherein each user who belongs to the security group may have permission to access the respective contact center service category and the associated one or more sets of contact information for communicating with call agents assigned to the respective contact center service category; and/or assigning (via the one or more processors) the at least some call agents to the security group based upon at least one of: (i) a job function related to a role of each of the at least some call agents within the computer-telephony integration system, or (ii) a contact center location corresponding to each of the at least some call agents within the computer-telephony integration system.

Moreover, the display may be a first display and the method may further include, for a system administrator: presenting (via the one or more processors and/or wired or wireless communication and/or data transmission) the plurality of contact center service categories and each of the one or more sets of contact information assigned to the plurality of contact center service categories on a second display for use by the system administrator; and/or presenting (via the one or more processors and/or wired or wireless communication and/or data transmission) one or more user controls for editing the presented one or more sets of contact information on the second display.

When the system administrator updates or removes one of the sets of contact information via the one or more user controls, the method may further include updating or removing (via the one or more processors) the set of contact information in or from the database; and/or for the call agent, presenting (via the one or more processors and/or wired or wireless communication and/or data transmission) the updated or removed set of contact information with each of the contact center service categories that the updated or removed set of contact information is assigned to on the first display.

When the system administrator, via the one or more user controls, removes one of the sets of contact information from one of the contact center service categories with which the set of contact information is assigned, the method may further include removing (via the one or more processors) the reference to the set of contact information stored with the contact center service category in the database.

Furthermore, when the system administrator, via the one or more user controls, adds a set of contact information and assigns the added set of contact information to one or more of the plurality of contact center service categories, the method may further include storing (via the one or more processors) the added set of contact information in the database; and/or for each of the assigned contact center service categories, storing (via the one or more processors) a reference to the added set of contact information with the respective assigned contact center service category in the database.

The one or more user controls for editing may allow the system administrator to add a set of contact information to the database, remove a set of contact information from the database, assign a set of contact information to a contact center service category, and/or remove an association between a contact center service category and a set of contact information. A particular type of contact center service may include at least one of: a banking service, an insurance sales service, an insurance claims service, a support service, an insurance underwriting service, or an insurance deductible service.

IX. EXEMPLARY SYSTEM FOR MANAGING A CONTACT CENTER DIRECTORY

In another aspect, a system for managing a contact center directory in a scalable computer-telephony integration system may be provided. The system may include one or more processors; a communication network; a database; and/or a non-transitory computer-readable memory communicatively coupled to the one or more processors, the communication network, and the database and storing thereon instructions. When executed by the one or more processors, the instructions may cause the system to: (1) generate a plurality of contact center service categories each corresponding to a particular type of contact center service in a computer-telephony integration system; for each of the plurality of contact center service categories: (2) generate one or more sets of contact information for communicating with call agents assigned to the respective contact center service category; and/or (3) store the respective contact center service category along with a reference to each of the one or more sets of contact information assigned to respective contact center service category in the database. The instructions may further cause the system to: for a call agent of a plurality of call agents: (4) present, via the communication network, one or more contact center service categories of the plurality of contact center service categories which the call agent has permission to access, and one or more sets of contact information assigned to each of the one or more contact center service categories on a display for use by the call agent; and/or (5) present, via the communication network, one or more user controls for transferring, dialing, or conferencing the call agents associated with the one or more sets of presented contact information on the display to facilitate efficiently transferring calls to call agents best suited for responding to an inquiry by a customer. The system may include additional, fewer, or alternate components and/or functionality, including that discussed elsewhere herein.

For instance, for each of the plurality of contact center service categories, the instructions may cause the system to assign at least some of the plurality of call agents permission to access the respective contact center service category such that the at least some call agents may have permission to view the respective contact center service category and associated one or more sets of contact information for communicating with the call agents assigned to the respective contact center service category; and/or deny access to the respective contact center service category for call agents who may not be assigned permission to access the respective contact center service category such that the unassigned call agents may not view the respective contact center service category and associated one or more sets of contact information for communicating with the call agents assigned to the respective contact center service category.

For each of the plurality of contact center service categories, to assign at least some of the plurality of call agents permission to access the respective contact center service category, the instructions may cause the system to generate a security group which includes a plurality of users who belong to the security group, wherein each user who belongs to the security group may have permission to access the respective contact center service category and the associated one or more sets of contact information for communicating with call agents assigned to the respective contact center service category; and/or assign the at least some call agents to the security group based upon at least one of: (i) a job function related to a role of each of the at least some call agents within the computer-telephony integration system, or (ii) a contact center location corresponding to each of the at least some call agents within the computer-telephony integration system.

Additionally, the display may be a first display and the instructions may further cause the system to, for a system administrator, present, via the communication network, the plurality of contact center service categories and each of the one or more sets of contact information assigned to the plurality of contact center service categories on a second display for use by the system administrator; and/or present, via the communication network, one or more user controls for editing the presented one or more sets of contact information on the second display.

When the system administrator updates or removes one of the sets of contact information via the one or more user controls, the instructions may further cause the system to update or remove the set of contact information in or from the database; and/or for the call agent, present, via the communication network, the updated or removed set of contact information with each of the contact center service categories that the updated or removed set of contact information is assigned to on the first display.

When the system administrator, via the one or more user controls, removes one of the sets of contact information from one of the contact center service categories with which the set of contact information is assigned, the instructions may further cause the system to remove the reference to the set of contact information stored with the contact center service category in the database.

Furthermore, when the system administrator, via the one or more user controls, adds a set of contact information and assigns the added set of contact information to one or more of the plurality of contact center service categories, the instructions may further cause the system to store the added set of contact information in the database; and/or for each of the assigned contact center service categories, store a reference to the added set of contact information with the respective assigned contact center service category in the database.

The one or more user controls for editing may allow the system administrator to add a set of contact information to the database, remove a set of contact information from the database, assign a set of contact information to a contact center service category, and/or remove an association between a contact center service category and a set of contact information. A particular type of contact center service may include at least one of: a banking service, an insurance sales service, an insurance claims service, a support service, an insurance underwriting service, or an insurance deductible service.

X. EXEMPLARY EMBODIMENTS

The present embodiments may relate to creating a scalable Computer Telephony Integration (CTI) application that meets the needs of all of a large enterprise's many and varied business areas while utilizing and overcoming the limitation of existing infrastructure to pass large amounts of data. The present embodiments may include the ability to (1) pass customer information generically from call agent to call agent; (2) create and easily maintain call center phone directories and/or only show call agents directories relevant to their work; (3) provide simplified application login to a correct gateway server using workstation credentials; and/or (4) provide agent or representative call status or presence information.

Exemplary Call Key

In one aspect, a computer-implemented method of managing a call center (CC) representative to CC representative telephone call transfer may be provided. A "call key" may be generated and used for the life of a customer call. The call key may be used to pass information between call center (CC) representatives. For instance, when a customer call is transferred among call representatives, the call key may also be transferred. Different call representatives may work with different systems. The call key may be used by the different systems and/or call representatives to access customer data and/or insurance policy information. As a result, data security may be enhanced as only the call key needs to be transferred between representatives, and not sensitive or policy information.

Also, by using the call key to access customer information related to a current customer call, and/or stored in a database, the call representative may avoid asking the customer annoying and/or repetitive or the same questions for a second time. As a result, a customer may be passed from one CC representative to another without requiring the customer to repeat information and/or answer the same questions. The call key may allow a telephone call to be transferred among representatives without requiring personal or sensitive information to be passed along as well. This may enhance security, as well as system performance due to limited capacity for passing data electronically.

One embodiment may include the use of Router Call Key Router Call Day (rckrcd) data to pass customer call information and/or to retrieve customer data. The customer data may be previously stored customer data or customer data stored during the present customer call, and as a result, a customer may not be required to repeat information.

In one aspect, a computer-implemented method of managing a call center representative to call center representative telephone call transfer may be provided. The method may include (1) receiving a customer call from a customer by a first call center representative located at a call center; (2) generating, via one or more processors, a call key associated with the customer call, the call key existing and being used for the life of the customer call and/or to transfer customer and/or policy information between representatives; (3) storing, via one or more processors, customer information and/or insurance policy related information gathered from the customer during the customer call and/or determined by the first call center representative while talking with the customer; (4) transferring the customer call, via one or more processors, from the first call center representative to a second call center representative along with the call key; (5) using the call key to retrieve, via one or more processors, from a memory unit the customer information and/or insurance policy related information gathered from the customer during the customer call and/or determined by the first call center representative while talking with the customer; and/or (6) presenting, via one or more processors, the customer information and/or insurance policy related information gathered from the customer during the customer call and/or determined by the first call center representative while talking with the customer on a display for use by the second call center representative during the customer call with the customer to facilitate alleviating electronically transferring sensitive information between call center representatives and/or reduce an amount of data electronically transferred between call center representatives during telephone call transfers. The method may include additional, less, or alternate actions, including those discussed elsewhere herein.

Exemplary Call Center Directory Management

A web-based interface may be created to allow call center administrators to maintain call center directories. A web service may provide directory information to a CTI system or server. As an example, a database system may be created or designed such that it can be managed by individual call centers. Changes made to phone numbers and/or groups may be made once and then be immediately propagated throughout duplicate uses within the call center directory.

The present embodiments may include use of an independent web page to manage directories. Access keyed to Lightweight Directory Access Protocol (LDAP) group and database design may allow information to be changed in one place and promulgated throughout the directory.

In another aspect, a central administration page may allow for automatically updating certain information throughout a system and/or across different categories or servers. For instance, categories may relate to various types of service, such as towing or auto repair. The central administration page may allow for automatically updating new telephone numbers for the services and/or security groups.

In one respect, a virtual "phone book" for a call agent may be created. The virtual phone book may be based upon a profile, a security rating or group, and/or line of business (e.g., auto, home, or life insurance, or vehicle or home loans) associated with a call agent. A menu may be present having a number of categories, such as claims; underwriting; quoting; binding; and/or individual state (e.g., Illinois). Each category in the menu may have a drill down menu. The virtual phone book may help ensure that a particular call agent is presented with information that is relevant to their work or line of business. The virtual phone book may be used to limit what types of information that the call agent sees on their computer display.

In one embodiment, dividing call agents into groups based upon their profiles may allow for directories to be more maintainable. By changing a phone number of a call agent one time, the change may be made in all security groups, permission or access level groupings, or other groupings, such a grouping associated with a catastrophic or insurance-related event. Editing of profiles may also be allowed.

Exemplary Gateway Login

A database may be created that pulls all gateway login information from various call environments into one table and a web service utilized by the CTI to authorize and individualize login. Software may be used to pull all relevant information from respective servers and place that information into one database. Tables may be added to a database that dynamically identifies all necessary gateways.

In one embodiment, an automated means of login into a system may be provided that streamlines the determination of which gateway a customer representative should be utilizing to access a computer system. The automated means aligns a customer representative to an appropriate working group or area, or line of business, such that incoming customer calls may be directed to an appropriate type of customer representative.

For instance, as a call representative enters their login information, the system may automatically look up a gateway (and/or routing server) that is assigned to the call representative or that the call representative is supposed to use (such as by using a user profile). The gateway may allow the call representative to automatically login and access the system or a specific server via their computer, such as server serving or dedicated to an individual working group or functional area (such as a claims or service department).

In one embodiment, each call agent may have several profiles, and each profile for the call agent may utilize a different server. As such, a data structure may store several profile/server pairs for each call agent having multiple profiles. The profile/server pairs may facilitate mapping a call agent to the correct server (or login gateway) in real-time or at runtime.

Dynamically mapping a call agent to the server corresponding to the profile that they are currently using may be beneficial and reduce inefficiencies, inconvenience, or mistakes. As an example, a given call agent may have a first profile associated with a specific line of business (auto insurance) for use on the weekend or Saturday, and a second profile associated with a different line of business (home insurance) for weekdays or Friday, and a third profile associated with another line of business (life insurance) for week nights. The first profile may be mapped to a default server, the second profile may be mapped to Server 1, and the third profile may be mapped to Server 10.

If a call agent has more than one profile, one may be a default profile. Each profile that is created for a call representative may restrict the type of calls and/or data that the call representative may receive and/or have access to. For instance, a profile may only allow the call representative to see certain numbers or access certain security groups. Each profile may be used by the system to route different types of calls to the call representative.

In one aspect, a computer-implemented method of logging onto a particular server selected from among multiple servers may be provided. The method may include (1) receiving, via one or more processors, a request to log into a CTI or other system that is generated from a computer associated with a call agent; (2) determining or otherwise selecting, via the one or more processors, a profile for the call agent based upon (i) the computer associated with the call agent, (ii) time of day, (iii) day of week, (iv) line of business (auto, home, life insurance, for instance), and/or (v) a GPS (Global Positioning System) or other location of the computer associated with the call agent; (3) determining or otherwise selecting, via the one or more processors, a server from among multiple servers for the call agent to log into the CTI or other system using or based upon the selected profile; and/or (4) logging the computer associated with the call agent into the CTI or other system, via the one or more processors, using or based upon the selected profile and/or selected server to facilitate mapping the call agent to a correct server that is appropriate for the call agent to use given the time of day, day of week, line of business, current computer, and/or location and/or to facilitate the call agent performing one or more services related to insurance products, such as providing quotes or information, selling insurance, and/or accepting/handling insurance claims. The method may include additional, less, or alternate actions, including those discussed elsewhere herein.

Exemplary Presence Information

In another aspect, a computer-implemented method of publishing a current status of (and/or presence information associated with) call center (CC) representatives may be provided. A module may be provided that determines, updates, and/or then displays the current call status of each CC representative for others in an organization to see. For instance, in some situations, it may be desirable to transfer a customer to a specific or original call representative that the customer was dealing with or talking to. Another call representative may use the updated status to determine whether or not the original call representative is available to handle the call, or if the original call representative is on another call and/or otherwise unavailable. As a result, a telephone call may not be transferred to a new call representative if that new call representative is busy or otherwise unavailable.

The presence information may be triggered by certain events. Additionally or alternatively, the presence information may be determined by the CTI system or server. The presence information may be used to determine which profile that the call representative wants to log into.

XI. ADDITIONAL CONSIDERATIONS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112, sixth paragraph.

The patent claims at the end of this patent application are not intended to be construed under 35 U.S.C. § 112(f) unless traditional means-plus-function language is expressly recited, such as "means for" or "step for" language being explicitly recited in the claim(s).

Accordingly, the term "security group," as used herein, may be used to refer to a group of user accounts, computer accounts, and/or other security groups which receive permission to access a certain secure data asset when the security group has permission to access the secure data asset.

As used herein, the term "secure data asset" may be used to refer to computer hardware (e.g., servers and switches), software, and/or confidential information owned by an organization. For example, secure data assets may include confidential files, proprietary information, user account information, databases, network drives, data tables within a database, files within a network drive, etc.

The term "contact center" as used herein, may be used to refer to an integrated, automated communications system that coordinates telephone and electronic contacts between an organization and the public. For example, a contact center may include several call agents with workstations that include a computing device and/or a telephone set/headset for each call agent for communicating with customers. Voice and/or data pathways to the contact center may be linked through computer-telephony integration.

Furthermore, the term "call agent" as used herein, may be used to refer to a person who handles incoming or outgoing customer calls at a contact center for an organization. For example, a call agent may address customer inquiries, customer complaints, and/or support issues. Each call agent may have a workstation at the contact center which may include a computing device and/or a telephone set/headset for communicating with customers and/or other call agents.

The term "insurance provider" as used herein, generally refers to a party and/or entity (e.g., a business and/or other organizational entity) that provides insurance products, e.g., by offering and/or issuing insurance policies. Typically, but not necessarily an insurance provider may be an insurance company. Further, an insurance provider may be any individual, group of individuals, company, corporation, and/or other type of entity that may issue insurance policies for customers, such as insurance policies associated with properties.

Additionally, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One may implement numerous alternate embodiments, using either current technology or technology developed after the filing date of this application.

We claim:

1. A computer-implemented method for presenting a contact center directory in a computer-telephony integration system, the method executed by one or more processors programmed to perform the method, the method comprising:
presenting, via one or more processors, a plurality of contact center service categories to a system administrator, each contact center service category corresponding to a particular type of contact center service in the computer-telephony integration system;
for each of the plurality of contact center service categories, presenting, via the one or more processors, one or more sets of contact information for communicating with call agents assigned to the contact center service category; and
presenting to the system administrator, via the one or more processors, one or more user controls for editing at least one of: (i) the plurality of contact center service categories, (ii) the one or more sets of contact information for communicating with the call agents assigned to the plurality of contact center service categories, or (iii) associations between the plurality of contact center service categories and the one or more sets of contact information for communicating with the call agents.

2. The method of claim 1, wherein presenting one or more user controls for editing the plurality of contact center service categories includes presenting, via the one or more processors, one or more user controls for adding a new contact center service category to the plurality of contact center service categories or removing one of the plurality of contact center service categories.

3. The method of claim 1, wherein presenting one or more user controls for editing the one or more sets of contact information includes presenting, via the one or more processors, one or more user controls for adding a new set of contact information to the one or more sets of contact information or removing one of the one or more sets of contact information.

4. The method of claim 1, wherein presenting one or more user controls for editing the associations between the plurality of contact center service categories and the one or more sets of contact information includes presenting, via the one or more processors, one or more user controls for assigning one of the one or more sets of contact information to one of the plurality of contact center service categories or removing an association between one of the one or more sets of contact information and one of the plurality of contact center service categories.

5. The method of claim 4, wherein:
when the set of contact information is assigned to the contact center service category, the method includes storing, via the one or more processors, a reference to the set of contact information with the contact center service category in a contact center directory database; and
when the association between the set of contact information and the contact center service category is removed, the method includes removing, via the one or more processors, the reference to the set of contact information from the contact center service category in the contact center directory database.

6. The method of claim 1, wherein the one or more user controls for editing are presented on a first display and on a second display, a call agent of the call agents is presented with one or more contact center service categories of the plurality of contact center service categories which the call agent has permission to access, the one or more sets of contact information for communicating with other call agents assigned to the selected contact center service category, and one or more user controls for transferring, dialing, or conferencing the other call agents associated with the one or more sets of presented contact information.

7. The method of claim 6, wherein when the system administrator edits one of the one or more sets of contact information, the method further comprises:
presenting, via the one or more processors, the edited set of contact information with each of the contact center service categories that the edited set of contact information is assigned to on the second display.

8. A client device for presenting a contact center directory in a computer-telephony integration system, the client device comprising:
one or more processors;
a non-transitory computer-readable memory communicatively coupled to the one or more processors, and storing thereon instructions that, when executed by the one or more processors, cause the client device to:
present a plurality of contact center service categories to a system administrator, each contact center service category corresponding to a particular type of contact center service in the computer-telephony integration system;
for each of the plurality of contact center service categories, present one or more sets of contact information for communicating with call agents assigned to the contact center service category; and
present to the system administrator one or more user controls for editing at least one of: (i) the plurality of contact center service categories, (ii) the one or more sets of contact information for communicating with the call agents assigned to the plurality of contact center service categories, or (iii) associations between the plurality of contact center service categories and the one or more sets of contact information for communicating with the call agents.

9. The client device of claim 8, wherein to present one or more user controls for editing the plurality of contact center service categories, the instructions cause the client device to present one or more user controls for adding a new contact center service category to the plurality of contact center service categories or removing one of the plurality of contact center service categories.

10. The client device of claim 8, wherein to present one or more user controls for editing the one or more sets of contact information, the instructions cause the client device to present one or more user controls for adding a new set of contact information to the one or more sets of contact information or removing one of the one or more sets of contact information.

11. The client device of claim 8, wherein to present one or more user controls for editing the associations between the plurality of contact center service categories and the one or more sets of contact information, the instructions cause the client device to present one or more user controls for assigning one of the one or more sets of contact information to one of the plurality of contact center service categories or removing an association between one of the one or more sets of contact information and one of the plurality of contact center service categories.

12. The client device of claim 11, wherein:
when the set of contact information is assigned to the contact center service category, the instructions cause the client device to store a reference to the set of contact information with the contact center service category in a contact center directory database; and
when the association between the set of contact information and the contact center service category is removed, the instructions cause the client device to store the reference to the set of contact information from the contact center service category in the contact center directory database.

13. The client device of claim 8, wherein the one or more user controls for editing are presented on a first display and on a second display, a call agent of the call agents is presented with one or more contact center service categories of the plurality of contact center service categories which the call agent has permission to access, the one or more sets of contact information for communicating with other call agents assigned to the selected contact center service category, and one or more user controls for transferring, dialing, or conferencing the other call agents associated with the one or more sets of presented contact information.

14. A non-transitory computer-readable memory storing thereon instructions that, when executed by one or more processors, cause the one or more processors to:
present a plurality of contact center service categories to a system administrator, each contact center service category corresponding to a particular type of contact center service in a computer-telephony integration system;
for each of the plurality of contact center service categories, present one or more sets of contact information for communicating with call agents assigned to the contact center service category; and
present to the system administrator one or more user controls for editing at least one of: (i) the plurality of contact center service categories, (ii) the one or more sets of contact information for communicating with the call agents assigned to the plurality of contact center service categories, or (iii) associations between the plurality of contact center service categories and the one or more sets of contact information for communicating with the call agents.

15. The computer-readable memory of claim 14, wherein to present one or more user controls for editing the plurality of contact center service categories, the instructions cause the one or more processors to present one or more user controls for adding a new contact center service category to the plurality of contact center service categories or removing one of the plurality of contact center service categories.

16. The computer-readable memory of claim 14, wherein to present one or more user controls for editing the one or more sets of contact information, the instructions cause the one or more processors to present one or more user controls for adding a new set of contact information to the one or more sets of contact information or removing one of the one or more sets of contact information.

17. The computer-readable memory of claim 14, wherein to present one or more user controls for editing the associations between the plurality of contact center service categories and the one or more sets of contact information, the instructions cause the one or more processors to present one or more user controls for assigning one of the one or more sets of contact information to one of the plurality of contact center service categories or removing an association between one of the one or more sets of contact information and one of the plurality of contact center service categories.

18. The computer-readable memory of claim 17, wherein:
when the set of contact information is assigned to the contact center service category, the instructions cause the one or more processors to store a reference to the set of contact information with the contact center service category in a contact center directory database; and
when the association between the set of contact information and the contact center service category is removed, the instructions cause the one or more processors to store the reference to the set of contact information from the contact center service category in the contact center directory database.

19. The computer-readable memory of claim 14, wherein the one or more user controls for editing are presented on a first display and on a second display, a call agent of the call agents is presented with one or more contact center service categories of the plurality of contact center service categories which the call agent has permission to access, the one or more sets of contact information for communicating with other call agents assigned to the selected contact center service category, and one or more user controls for transferring, dialing, or conferencing the other call agents associated with the one or more sets of presented contact information.

20. The computer-readable memory of claim 19, wherein when the system administrator edits one of the one or more sets of contact information, the instructions cause the one or more processors to:
   present the edited set of contact information with each of the contact center service categories that the edited set of contact information is assigned to on the second display.

* * * * *